(12) United States Patent
Cao et al.

(10) Patent No.: US 10,126,560 B2
(45) Date of Patent: Nov. 13, 2018

(54) SPECTRUM-GENERATION SYSTEM BASED ON MULTIPLE-DIFFRACTION OPTICAL PHASOMETRY

(71) Applicant: THE NATIONAL ENGINEERING RESEARCH CENTER OF OPTICAL INSTRUMENTATION, Hangzhou (CN)

(72) Inventors: Xiangqun Cao, Hangzhou (CN); Bin Lin, Hangzhou (CN); Jian Bai, Hangzhou (CN); Yu Cao, Hangzhou (CN)

(73) Assignee: National Engineering Research Center for Optical Instrumentation (CN)

( * ) Notice: Subject to any disclaimer, the term of this patent is extended or adjusted under 35 U.S.C. 154(b) by 59 days.

(21) Appl. No.: 15/047,500

(22) Filed: Feb. 18, 2016

(65) Prior Publication Data

US 2017/0242259 A1   Aug. 24, 2017

(51) Int. Cl.
*G02B 27/10* (2006.01)
*G02B 27/20* (2006.01)
*G02B 27/42* (2006.01)
*G01C 15/00* (2006.01)
*G01B 9/00* (2006.01)
(Continued)

(52) U.S. Cl.
CPC ......... *G02B 27/1093* (2013.01); *G02B 27/20* (2013.01); *G02B 27/4233* (2013.01); *G02B 27/4277* (2013.01); *G01B 9/00* (2013.01); *G01B 11/00* (2013.01); *G01C 15/002* (2013.01); *G01D 5/347* (2013.01)

(58) Field of Classification Search
CPC ............... G02B 27/1093; G02B 27/20; G02B 27/4233; G02B 27/4277; G01C 15/002; G01B 9/00; G01B 11/00; G01D 5/347
USPC .......... 33/286, 702, 706–707; 356/499, 509; 369/44.23
See application file for complete search history.

(56) References Cited

U.S. PATENT DOCUMENTS 4,091,281 A * 5/1978 Willhelm ........... G02B 26/0808
250/237 G
4,355,898 A * 10/1982 Dakin .................... G01K 11/12
356/510
(Continued)

FOREIGN PATENT DOCUMENTS

JP            08271711      10/1996
WO          2014/006564     4/2014

*Primary Examiner* — R. A. Smith
*Assistant Examiner* — Tania Courson
(74) *Attorney, Agent, or Firm* — Fish IP Law, LLP

(57) ABSTRACT

An optical guide has at least two diffraction gratings in serial in front of a light source in order to diffract a light beam from the light source twice. The first diffraction grating could split the light beam into several parallel light beams along a first axis, and the second diffraction grating could split the light beams into several points of light along a second axis, and so on and so forth. By rotating the diffraction gratings relative to one another and by adjusting the distance between the diffraction gratings, a user of the optical guide could adjust the angle of the axis points and adjust a relative distance of the points of light relative to one another. These light beams could provide convenient guides for users in a variety of applications.

10 Claims, 23 Drawing Sheets

(51) Int. Cl.
*G01B 11/00* (2006.01)
*G01D 5/347* (2006.01)

(56) References Cited

U.S. PATENT DOCUMENTS

| | | | | |
|---|---|---|---|---|
| 4,455,087 A * | 6/1984 | Allemand | ............... | G01J 3/18 |
| | | | | 356/333 |
| 4,960,321 A * | 10/1990 | Takahashi | ............ | G11B 7/0932 |
| | | | | 359/813 |
| 5,008,873 A * | 4/1991 | Tanaka | .................. | G11B 7/08 |
| | | | | 359/822 |
| 5,172,485 A * | 12/1992 | Gerhard | ............... | G01B 3/002 |
| | | | | 33/558 |
| 5,267,089 A * | 11/1993 | Yamamoto | ............ | G11B 7/08 |
| | | | | 359/822 |
| 5,450,199 A * | 9/1995 | Rieder | .................. | G01D 5/38 |
| | | | | 250/237 G |
| 5,488,594 A * | 1/1996 | Kobayashi | ............ | G11B 7/22 |
| | | | | 369/44.14 |
| 5,530,257 A * | 6/1996 | Mizutani | ............... | G03F 9/7049 |
| | | | | 250/548 |
| 5,565,983 A * | 10/1996 | Barnard | ................. | G01J 3/02 |
| | | | | 356/328 |
| 5,760,392 A * | 6/1998 | Hisamoto | ............ | G01B 5/0014 |
| | | | | 250/237 G |
| 5,774,219 A * | 6/1998 | Matsuura | ............ | H03M 1/301 |
| | | | | 250/237 G |
| 6,342,697 B1 * | 1/2002 | Nagai | ................. | H03M 1/308 |
| | | | | 250/231.13 |
| 6,567,354 B2 * | 5/2003 | Yanagawa | ............ | G11B 7/0956 |
| | | | | 369/44.23 |
| 6,578,283 B2 * | 6/2003 | Nishi | ................. | G01D 5/34753 |
| | | | | 33/706 |
| 6,879,405 B2 * | 4/2005 | Tamiya | ............... | G01D 5/34792 |
| | | | | 250/231.13 |
| 6,952,260 B2 * | 10/2005 | Xiao | ..................... | G01J 3/04 |
| | | | | 356/326 |
| 6,963,448 B1 | 11/2005 | Hayakawa | | |
| 7,038,775 B2 * | 5/2006 | Sakai | ................ | G01J 3/02 |
| | | | | 356/328 |
| 7,186,969 B2 * | 3/2007 | Shimomura | ............ | G01D 5/00 |
| | | | | 250/231.13 |
| 7,289,229 B2 * | 10/2007 | Otsuka | ............... | G01D 5/34715 |
| | | | | 250/237 G |
| 7,342,852 B2 * | 3/2008 | Bryan | ................ | G11B 7/0917 |
| | | | | 369/44.23 |
| 7,411,660 B2 | 8/2008 | Cho | | |
| 7,453,788 B2 * | 11/2008 | Yasuda | .................. | G01C 21/00 |
| | | | | 359/708 |
| 7,484,304 B2 | 2/2009 | Campagna | | |
| 7,502,108 B2 * | 3/2009 | Fritsch | ................. | G01B 11/306 |
| | | | | 356/326 |
| 7,595,482 B2 | 9/2009 | Nakayama | | |
| 7,646,848 B2 | 1/2010 | Suominen | | |
| 7,821,625 B2 | 10/2010 | Downey | | |
| 7,879,596 B2 | 2/2011 | Goh | | |
| 7,903,336 B2 * | 3/2011 | Pelsue | .................... | B41M 5/24 |
| | | | | 250/237 G |
| 7,920,444 B2 * | 4/2011 | Tashiro | .................... | G11B 7/22 |
| | | | | 369/112.01 |
| 8,209,874 B1 | 7/2012 | Tribble | | |
| 8,363,516 B2 * | 1/2013 | Feng | .................. | G11B 7/08523 |
| | | | | 369/44.23 |
| 8,411,816 B2 * | 4/2013 | Ohara | ................... | A61B 6/484 |
| | | | | 378/36 |
| 8,730,483 B2 * | 5/2014 | Ikeda | ..................... | G01D 5/38 |
| | | | | 356/499 |
| 8,894,216 B2 | 11/2014 | Reichow | | |
| 8,922,785 B2 * | 12/2014 | Oyama | .................. | B60T 17/221 |
| | | | | 356/499 |
| 9,329,059 B2 * | 5/2016 | Hayashi | ................. | G01D 5/345 |
| 9,597,045 B2 * | 3/2017 | Ohara | ................... | A61B 6/484 |
| 2002/0071472 A1 * | 6/2002 | Dickson | .................. | G02B 5/32 |
| | | | | 372/102 |
| 2002/0105725 A1 * | 8/2002 | Sweatt | .................... | G01J 3/18 |
| | | | | 359/566 |
| 2004/0046956 A1 * | 3/2004 | Gould | .................... | G01J 3/02 |
| | | | | 356/333 |
| 2004/0090637 A1 * | 5/2004 | Holzapfel | ............... | G01D 5/38 |
| | | | | 356/499 |
| 2004/0145739 A1 * | 7/2004 | Hopler | .................... | G01J 3/12 |
| | | | | 356/331 |
| 2005/0007587 A1 * | 1/2005 | Harada | .................... | G01J 3/18 |
| | | | | 356/333 |
| 2005/0083825 A1 * | 4/2005 | Ishihara | ................. | G11B 7/22 |
| | | | | 369/112.05 |
| 2005/0140985 A1 * | 6/2005 | Takahashi | ............... | G01D 5/38 |
| | | | | 356/499 |
| 2007/0273957 A1 * | 11/2007 | Zalevsky | ............ | G02B 27/0927 |
| | | | | 359/326 |
| 2008/0123105 A1 * | 5/2008 | Seki | ................... | G02B 27/4233 |
| | | | | 356/521 |
| 2008/0282566 A1 * | 11/2008 | Holzapfel | .......... | G01D 5/34723 |
| | | | | 33/707 |
| 2008/0309934 A1 * | 12/2008 | Gould | ....................... | G01J 3/02 |
| | | | | 356/318 |
| 2012/0102659 A1 | 5/2012 | Ingham | | |
| 2014/0028805 A1 * | 1/2014 | Tohme | ................. | G01C 15/002 |
| | | | | 348/47 |
| 2014/0173924 A1 * | 6/2014 | Wu | ........................ | G01B 3/20 |
| | | | | 33/559 |
| 2014/0202013 A1 | 7/2014 | Smith | | |

\* cited by examiner

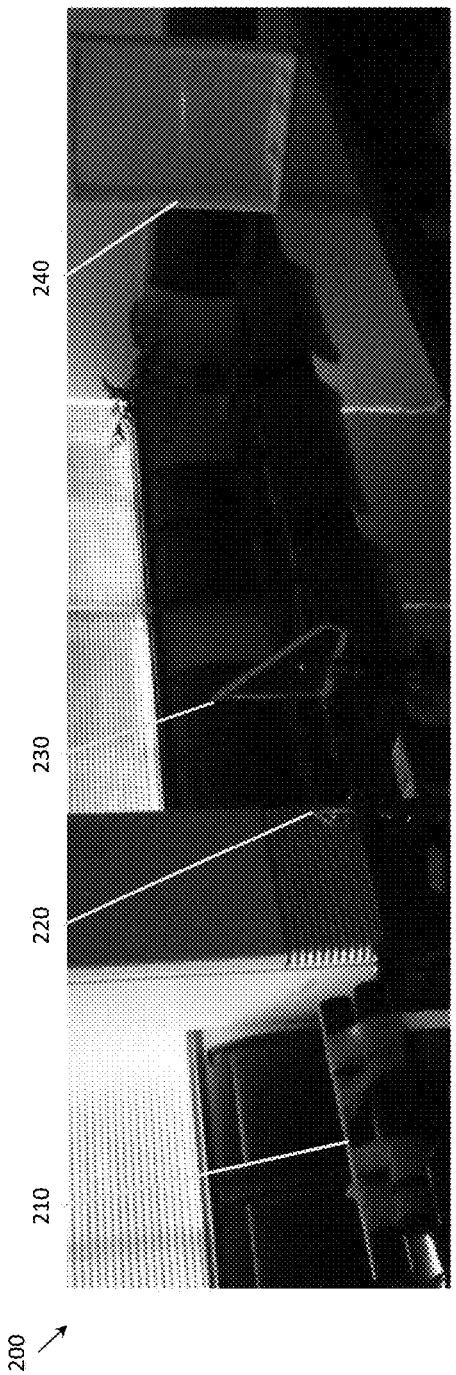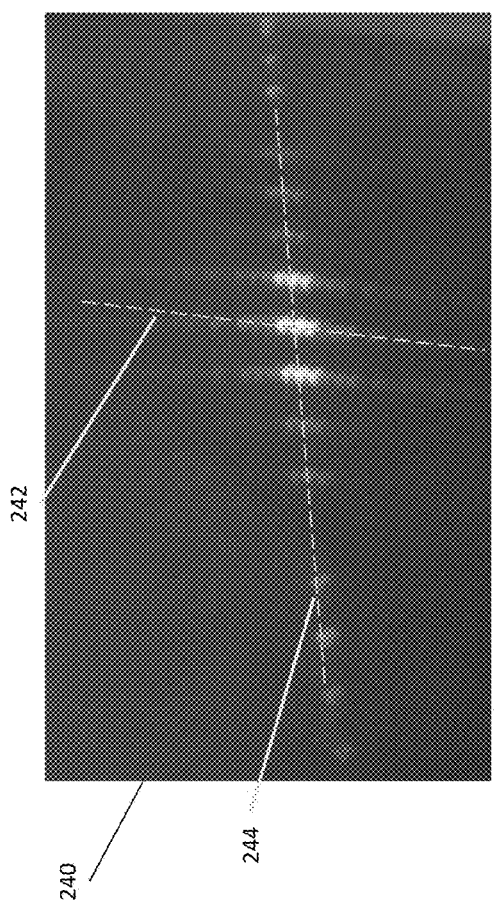
Figure 2A
Figure 2B

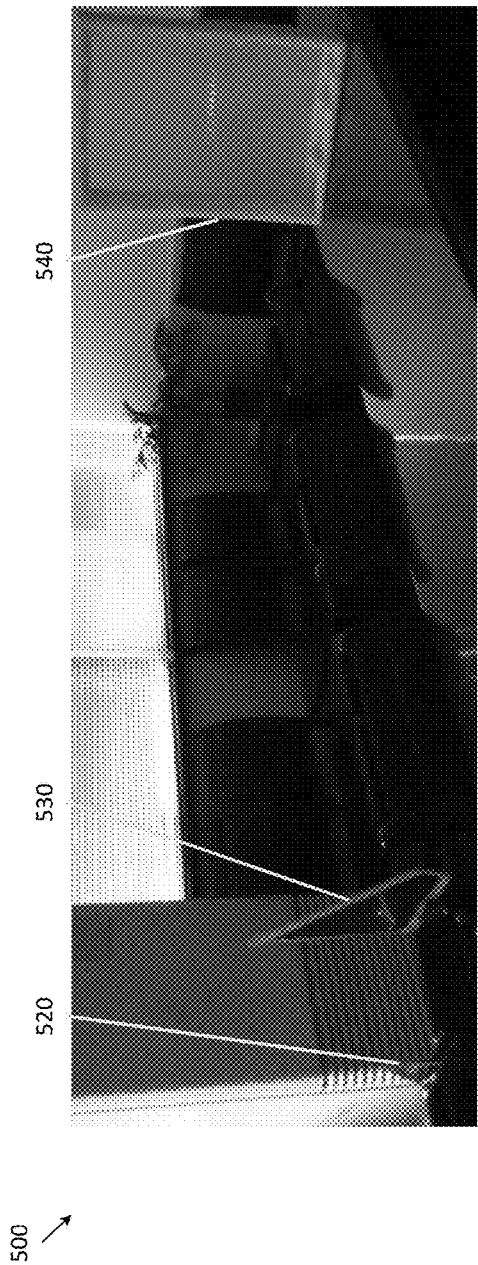
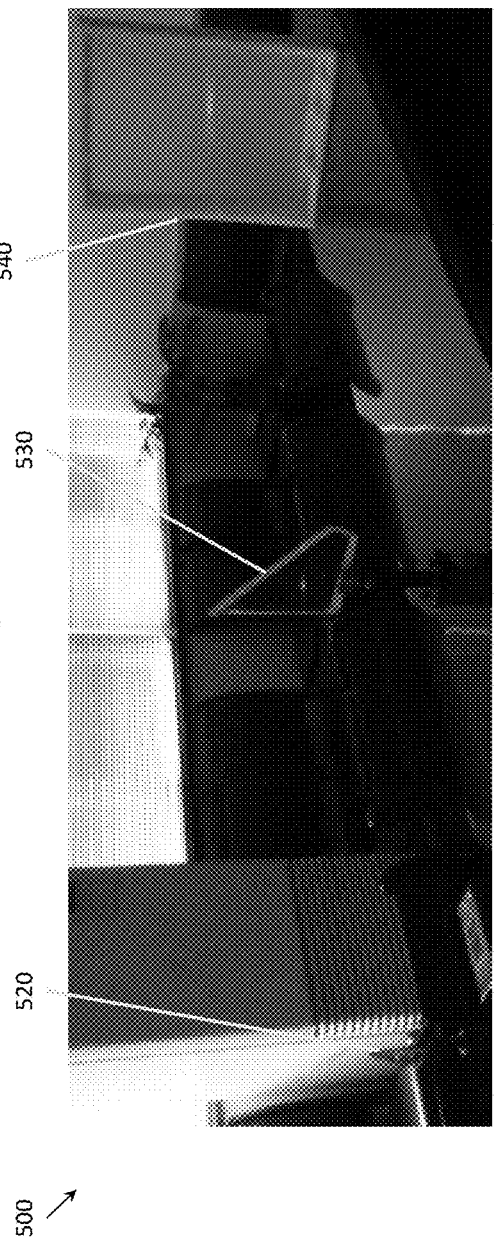

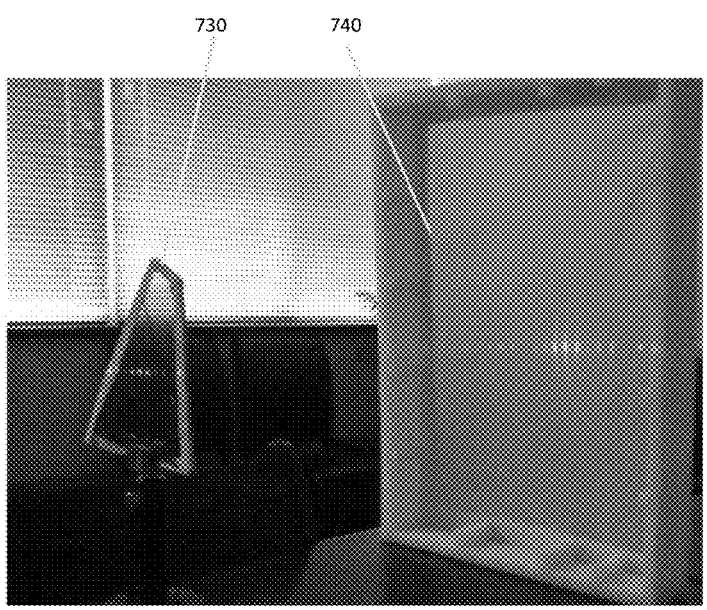
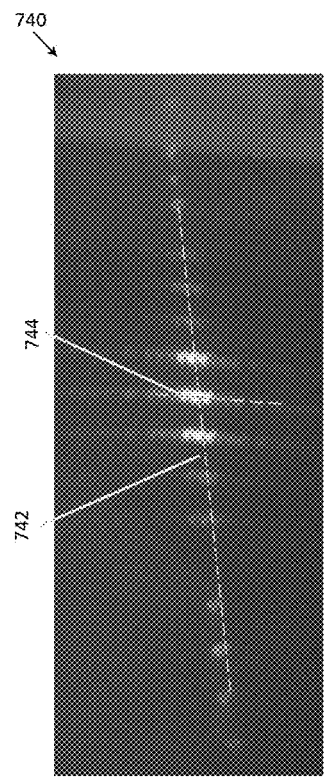
Figure 7B
Figure 7C

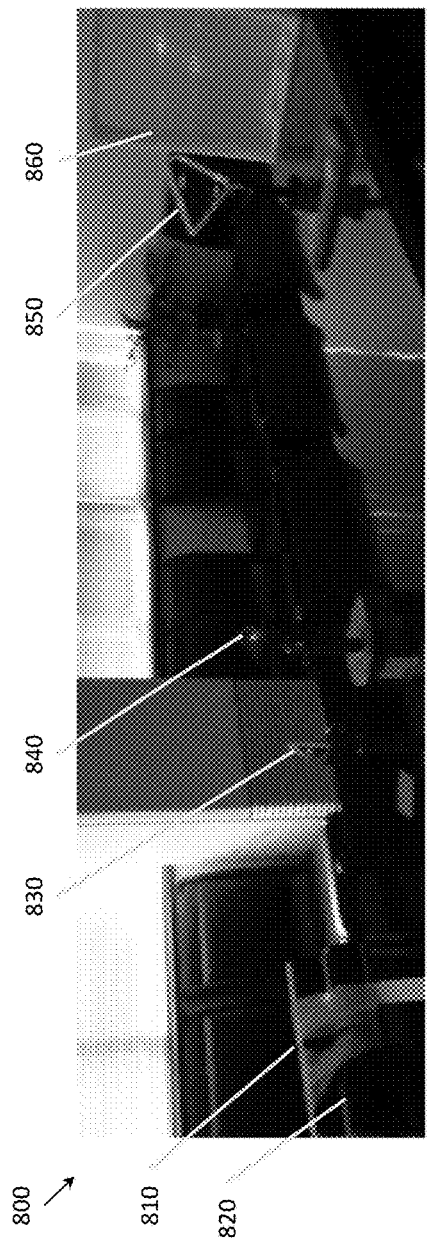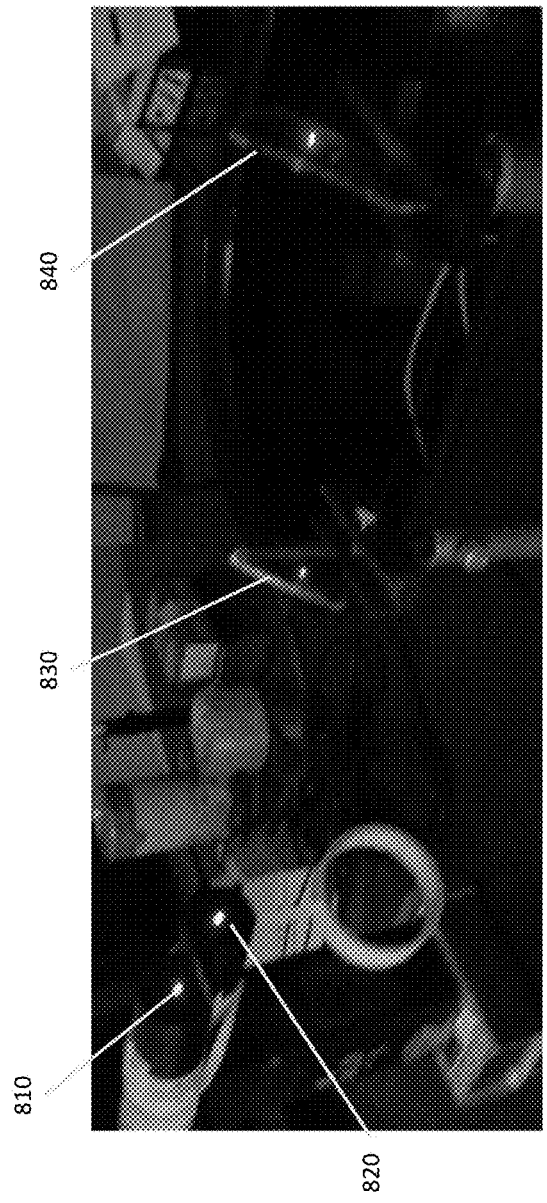

1050

1050

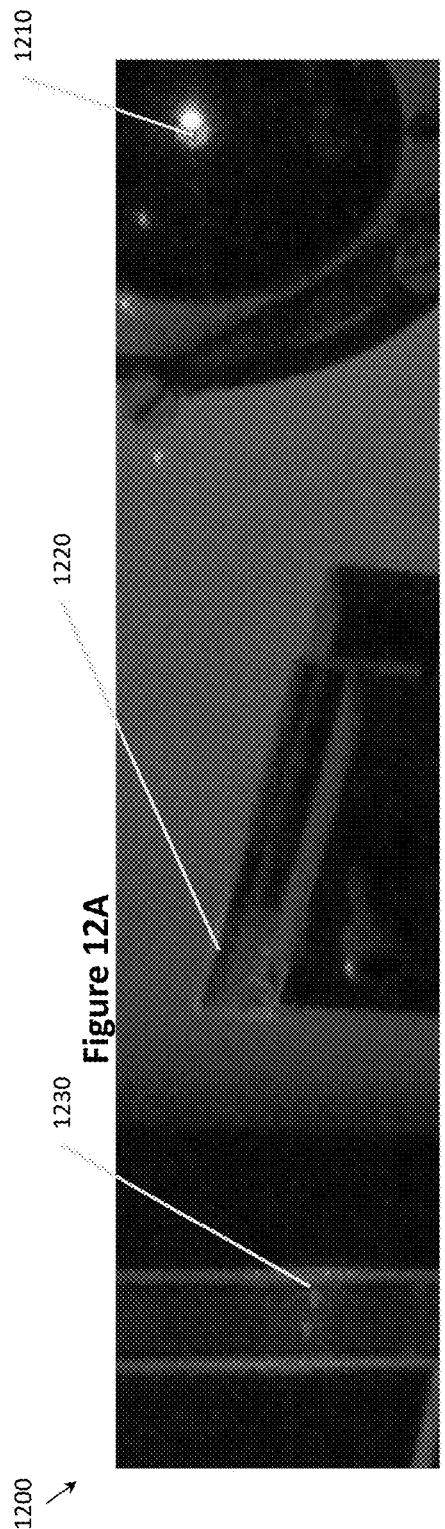
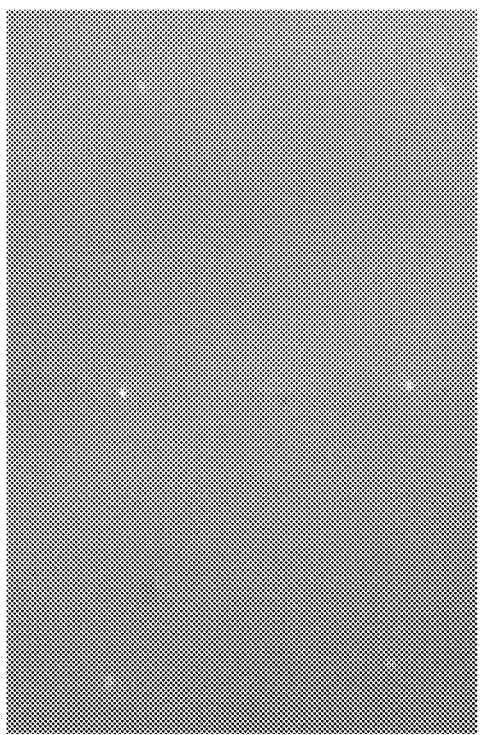
Figure 12A
Figure 12B

SPECTRUM-GENERATION SYSTEM BASED ON MULTIPLE-DIFFRACTION OPTICAL PHASOMETRY

FIELD OF THE INVENTION

The field of the invention is optical guides.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

It is important to use accurate measurement instruments when affixing or constructing permanent or semi-permanent structures. Rulers of various sizes and shapes are useful for such a task, however, such systems typically need to make physical contact with an object being measured, and oftentimes cannot easily scale to much larger or much smaller sizes. Scalable measurement devices that do not need to physically touch an object to obtain an accurate measurement are useful to measure structures of various sizes and locations.

U.S. Pat. No. 7,484,306 to Campanga teaches a craft ruler having a laser module that could be positioned anywhere along a longitudinal axis of the ruler. The laser module emits a beam that defines a crafting guideline on an adjacent surface, where the guideline could be adjusted to be at an angle to the straight edge of the ruler. While Campagna's system is relatively scalable, Campagna's system requires a user to place the ruler directly on top of the device requiring the guideline, which may not always be feasible.

U.S. Pat. No. 8,209,874 to Tribble teaches a construction tool system that users a laser to align foundational construction components, such as frames for buildings. Tribble's laser light unit directs the laser light in various directions— horizontal, vertical, and pivotal—and could diffract the laser beam using prisms, allowing a single laser beam to hit a plurality of points on a wall. Tribble's system, however, requires a user to install prism splitters at every intersection in order to create a grid guide that can be followed. Installing prism splitters at every intersection, however, requires a user to already know appropriate measurements before installing the splitters.

WO 2014/06564 to Boyle teaches a structured light source that projects a grid pattern onto a surface. Scenes that are projected onto the grid could then be measured using the grid, and range information could be obtained from determining the relative sizes of relative components of the grid. Boyle's grid, however, needs to be projected using a beam that is cut into a strict 90 degree grid pattern and isn't able to project other types of patterns.

Thus, there remains a need for a system and method that improves the way light can be used as an indicator guide.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which an optical guide provides a grid of points on a surface of an object. The optical guide forms the grid by placing at least two diffraction gratings in serial to one another, such that the orientation axis of each grating is offset from one another. Such an optical guide is referred to herein as a "multiple diffraction optical phasometry device" or, for only two diffraction gratings, a "double diffraction optical phasometry device."

The optical guide generally comprises a light source that directs a beam of light towards serialized diffraction gratings. The light source is preferably a laser, such as a semiconductor laser, a solid state laser, a gas laser, a metal-vapor laser, a chemical laser, a dye laser, a point light source, a line light source, an X-ray, or even light of other properties, both visual and non-visual.

While the light source is preferably a laser, the light source could be any suitable light source that directs a beam of light towards the diffraction gratings such that the beam of light is diffracted multiple times as it is split by each serialized diffraction grating. The light source is preferably focused towards a surface of at least one of the diffraction gratings, and is operable by a user interface, such as a button or a switch, that activates or deactivates the light source.

Contemplated gratings include reflective gratings, passing-through gratings, grid gratings, diffraction gratings, or any object that exhibits diffraction phenomenon (e.g. a filament).

At least two diffraction gratings are preferably configured in serial to one another, such that a beam of light from the light source hits a first diffraction grating to produce a first plurality of light beams that are spread along a first axis, and at least one of the produced light beams then hits the next diffraction grating to produce a second plurality of light beams that are spread along a second axis, and so on and so forth for however many diffraction gratings are set forth in serial to one another. Generally, two diffraction gratings are used, which produces a grid of points of light. Each diffraction grating is preferably configured to split a light beam directed towards the diffraction grating into three or more light beams. The diffraction grating could be configured in any suitable manner to split a light beam, for example by using a filament, slits, prisms, or angled surfaces, but is preferably shaped to diffract substantially all photons that hit its surface, for example by being shaped to have triangular, sinusoidal, or even an asymmetric triangular surface. As used herein, a diffraction grating that is shaped to diffract "substantially all" photons that hit its surface is a diffraction grating that allows more than 90% of photons that hit its surface to either pass through to the other side or reflect back towards the source of light. (i.e. not a nonreflective diffraction grating with mere slits) While the diffraction grating could be sized and disposed to split a light beam into a plurality of unevenly spaced light beams, each diffraction grating is preferably sized and disposed to split a light beam into a plurality of substantially evenly spaced light beams. As used herein, a diffraction grating that is sized and disposed to split a light beam into a plurality of substantially evenly spaced light beams produces a series of light beams that are spread along an axis of a plane that, when measured, differ in spacing by no more than 5% from one another, and preferably differ in spacing by no more than 3%, 2%, 1%, 0.5% or even 0.01% from one another.

An adjustment mechanism, such as adjustment mechanisms 235, 535, 635, 735, 835, 935, or 1035), coupled with one or more of the diffraction gratings could be used to adjust an angle of the diffraction grating's axis with respect to another diffraction grating's axis. Contemplated adjustment mechanisms include hinges, gears, axles, or cam and follower matings that are used to rotate and/or turn the diffraction grating. An angled indicator preferably shows a measurement of the angle of a diffraction grating's axis with respect to another diffraction grating. Contemplated angled indicators include markings on a protractor or a sliding indicator that slides along numbers that indicate the angle of the axis.

An adjustment mechanism also preferably adjusts the distance of one or more of the diffraction gratings with respect to one another, and/or the light source itself. A position indicator preferably shows a representative distance between one diffraction grating and either another diffraction grating or the light source. Preferably the light source and diffraction gratings are positioned among one another in such a way as to ensure that the spacing between the plurality of beams produced by the diffraction gratings are substantially equal to one another. (e.g. the plurality of light beams produced by a first diffraction grating are spaced apart by 2 cm, and the plurality of light beams produced by a second diffraction grating are spaced apart by 2 cm, when measured on an object that the light beams hit) As used herein, spacings that are "substantially equal" to one another are equal to one another within a 5%, 3%, 2%, or preferably 1% tolerance.

A measurement device, such as a laser ruler, could be used that measures a distance between an object that the beams of light hit and a calibration point of the optical guide (e.g. the position of the diffraction grating that is the closest to the object). The distance could be used to determine how far apart the projected beams of light are from one another. Preferably, a computer processor, such as computer processor 255, automatically calculates the spacing between projected beams of light as a function of the distance between the calibration point and the object. In an embodiment where an adjustment mechanism is used to adjust the distance of diffraction gratings between one another, the computer typically automatically calculates the spacing as a function of the distance between the calibration point and the object, the distance between the source of light and the first diffraction grating, the distance between the source of light and the second diffraction grating, and a refractive index of each diffraction grating. The computer is preferably functionally coupled to a display and presents a representation of the calculated spacing to the display (e.g. displays the number 1.5 in for a grid having points of light that are spaced 1.5 in. away from one another.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 2A show a working system employing a DDOP system.

FIG. 2B shows a close-up image of a surface of the DDOP system of FIG. 2A.

FIG. 5A show embodiments of another DDOP system

FIG. 5B shows the DDOP system of FIG. 5A having a differing distance between the gratings.

FIG. 7B shows a close-up of the second grating of the DDOP system of FIG. 7A.

FIG. 7C shows a close-up of the surface of the DDOP system of FIG. 7B.

FIGS. 8A-8D show an embodiment that contains two light sources and three gratings.

FIGS. 12A-12B show the embodiment of FIG. 11A having a second optical pattern impacted by a second line number of the gratings.

DETAILED DESCRIPTION

Figure 1:
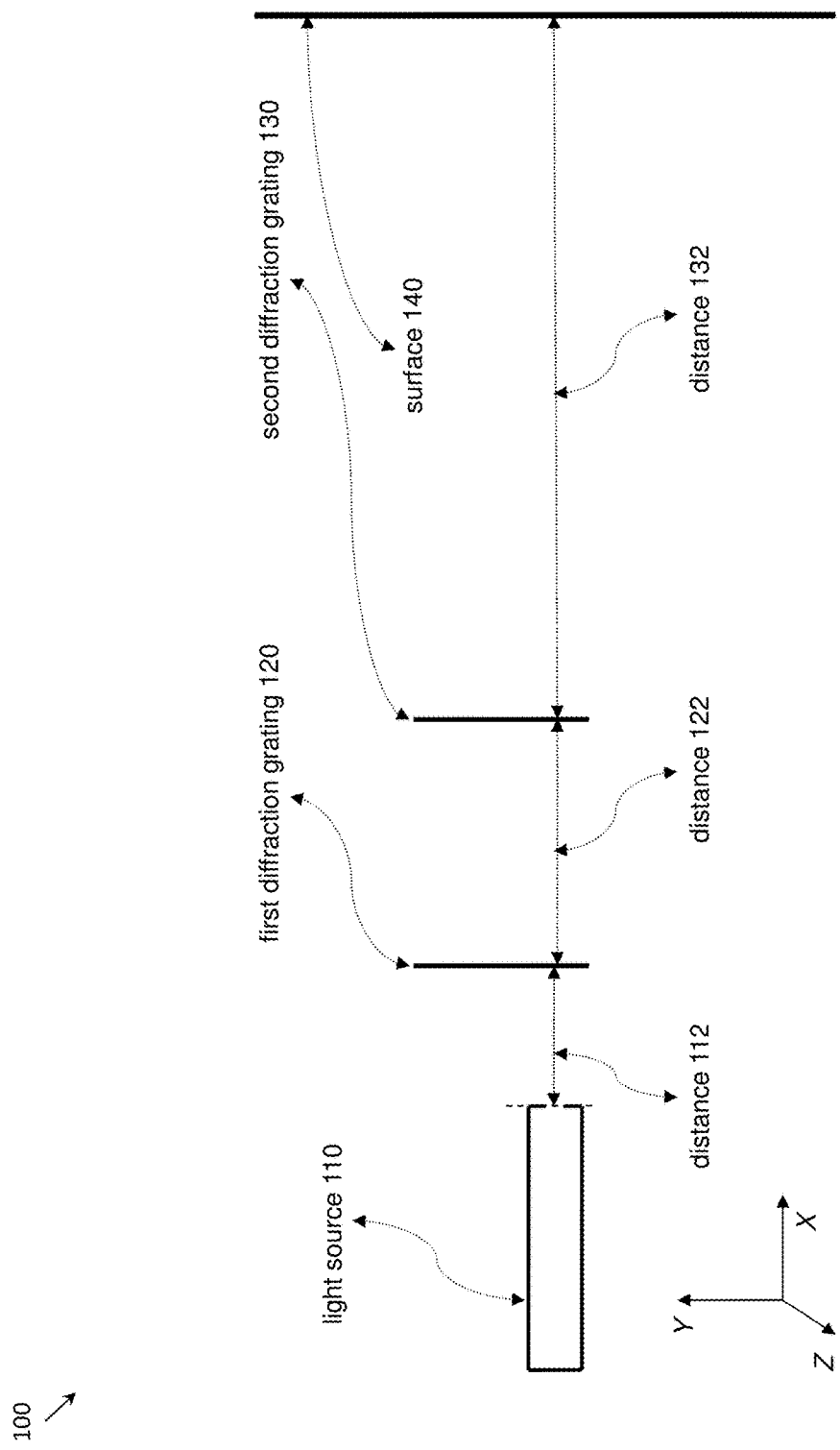
FIG. 1 is a schematic of an inventive system employing Double Diffraction Optical Phasometry (DDOP).

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including providing an optical guide for a user.

The inventive subject matter provides apparatus, systems, and methods in which an optical guide provides a grid of points on a surface of an object.

FIG. 1 is a schematic diagram of a Double Diffraction Optical Phasometry (DDOS) system 100. A DDOS system 100 has a light source 110, a first diffraction grating 120, a second diffraction grating 130, and a surface 140. Light source 110 could be any contemplated light source, for example an infrared lamp, an incandescent bulb, an ultraviolet lamp, or even a lens or mirror that reflects natural light, but is preferably a laser that emanates a concentrated band of light. In some embodiments, light source 110 could be a plurality of light sources that are aimed at the diffraction gratings serially (for example aimed first at first diffraction grating 120, whose diffracted light then hits second diffraction grating 130). In other embodiments, light source 110 could comprise a plurality of light sources, where only a subset of the light sources are activated at a time, for example a user interface (e.g. a button or a touch screen) could be provided that allows a user to activate either a red laser, a green laser, and/or an infrared or ultraviolet light source. Light emitted by light source 110 travels distance 112, and is incident on first grating 120. Some of the light that passes through first grating 120 (the extent of how much light is allowed to pass through is called the "width") in a first pattern, distributed along a first axis. The subset of light that passes through first grating 120 then travels distance 122 and is incident on second diffraction grating 130. Some of the light that hits diffraction grating 130 (again, the extent of how much light is allowed to pass through is called the "width"), which distributes the light along a second axis. In some embodiments the first axis and second axis could be aligned with one another, but preferably the orientation of diffraction grating 130 is different than the orientation of diffraction grating 120, allowing the light that hits both diffraction gratings to be distributed along two different axis. The light that passes through diffraction grating 130 then travels distance 132, and illuminates surface 140, upon which an optical pattern appears (not shown).

While system 110 shows only two gratings whose flat planes are parallel to one another, more gratings could be used to diffract light in various ways. For example, three, four, or five gratings could be used to diffract light along three or more separate axis, and the gratings do not need to be aligned to have each plane parallel to one another. Gratings could angle diffracted light along a path without departing from the scope of the current invention.

As used herein, a "diffraction grating" comprises any material that diffracts a light source along an axis, and could be periodic or aperiodic. A grating could diffract a light source along multiple wavelengths, could diffract a light source using ridges or rulings on its surface, and could diffract using dark lines that block parts of the light from traveling through the grating. As used herein, a "surface" could be any surface upon which measurements are made.

The system creates an optical pattern which contains several elements with certain angular relationships and distance relationships; the membership of the elements, the angular relationships and distance relationships are changeable by changing characteristics of the components, as well as by the distances (for example, distance 112, distance 122, and distance 132 among the components, as well as by the angular relationships (e.g. the angular relationship between the two gratings, the angular relationship between the front plane of light source 110 and the first diffraction grating, the angular relationship between the plane of the second diffraction grating and the plane of surface 140) among the components.

FIG. 2A and FIG. 2B both illustrate a DDOP system 200 that conforms with the schematic of FIG. 1. Light emitted from laser 210 is incident on a first grating 220, which is split along a first axis, and is then incident on a second grating 230. On second grating 230, a number of bright spots refract light, and one can see the central aperture plus a number of pairs of spectra. Second grating 230 then splits each incident light beam (the split beams of light from first grating 220) across a second axis, and displays the light on surface 240 (shown here as a white cloth erected across a wooden frame), showing an optical pattern on the plane. The optical pattern 242 is shown in more detail in FIG. 2B. As shown, the initial beam of light spreads across first axis 242, and spreads across second axis 244 to form an optical pattern on surface 240. As a user rotates either grating 220 or grating 230, the optical pattern splays over the surface.

(I-b) Measurement.

Figure 3:
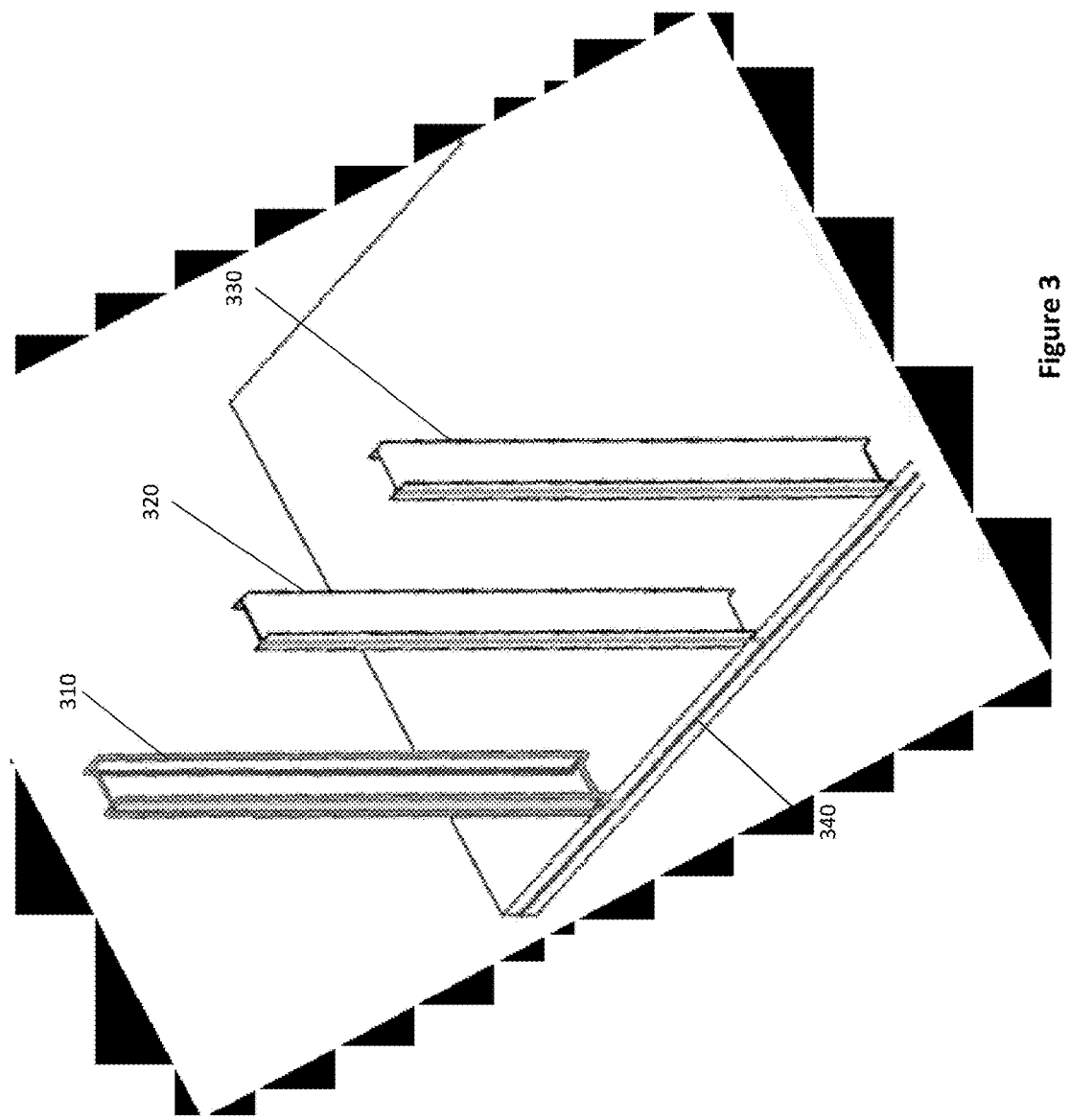
FIG. 3 shows a picture and a schematic diagram of a large structure measured by a DDOP system.

When measuring structures, the structures could have one or more elements that form angles with one another, and one or more elements that have distance relationships that need to be measured and/or maintained. It is useful to use optical lasers to mark such structures with accuracy. Measuring angular relationships between elements of a structure (e.g. parallel elements, elements that meet at a right angle, elements that meet at a 45 degree angle), measuring the distance between elements of a structure (e.g. ensuring that one element is 5 feet from another element) or maintaining proportional distances (e.g. ensuring that one element is ⅕ the distance from a second element as it is from a third element, ensuring that a first and second element are equidistant from a third element), could be of paramount importance As an example, consider the two structures shown in FIG. 3. In FIG. 3, a concrete structure for a building is under construction. The three vertical beams 310, 320, and 330 respectively in the picture need to be parallel to one another and need to form equal intervals. In addition, each vertical beam needs to be perpendicular to ground 340. Providing laser guidance systems to ensure that the beams are parallel to one another, and are placed in equal intervals are of paramount importance. Thus measurements of these angular relationships and distance relationships can be maintained using the inventive subject matter.

The characteristics of the diffractions by the gratings, the gratings themselves, the distances among the components, the characteristics of the light source(s), and the "width" of the passing through, could be altered in order to alter the relationships among the various elements of an optical pattern displayed on a surface.

In a contemplated method, the components of a DDOP could be set up and the light could be switched on such that light from the light source is diffracted through the first grating and then through the second grating to form an optical pattern on the surface. The parameters of the optical pattern could then be physically measured and recorded. For example, if the surface comprises a grid, the location of each dot on the grid could be recorded manually, or preferably through a light-sensitive sensor that records where points of light having a luminosity over a threshold number (e.g. 300 lumens) are. Relationships between the dots could also be recorded, such as a distance from one dot to another, and an angled relationship between two sets of parallel lines formed by a series of parallel rows dots. (which would show the angle of the first axis relative to the second axis). While FIG. 2A shows straight rows of dots, the system could be configured to provide a curved row of dots without departing from the scope of the invention, for example using a grating with a curved surface or varied concentrations of material. The measurements parameters could then be plugged into theoretic formulas to yield measurements of the surface itself, or computational methods could be employed when theoretic formulas fail to yield analytic solutions.

For example, a user could measure the distance between the light source and the first grating, the distance between the first grating and the second grating, and the distance between the second grating and the surface to determine the distance between two dots, or could measure the distance between the light source and the first grating, the distance between the first grating and the second grating, and the distance between two dots to determine the distance between the second grating and the surface. In some embodiments, the measured distances could be input into a computer system coupled to the laser diffraction system in order to calibrate the device. In other embodiments, the system could be aimed at a line scan camera that records the optical pattern splayed on the surface. Each of the light source 110, first grating 120, second grating 130, and line scan camera (surface 140), could be coupled to a computer system that detects the status of each object (e.g. whether light source 110 is on or off, the intensity of light source 110, the location of light source 110, the location of first grating 120, the location of second grating 130, the location of surface 140, the orientation of first grating 120, and the orientation of second grating 130) in order to calibrate the device for use.

In some embodiments, a DDOP system could be used to measure an object upon which the optical pattern is projected. For example, when portions of the object (e.g. an edge of a building is aligned with a series of dots or a line in the object is aligned with a series of dots) are aligned with portions of the optical pattern, then a user could determine measurements of the object. In other embodiments, a DDOP system could be used to measure a component, or measure one or more relationships among components, of the system. For example, in a DDOP system, the user could know the distance from the light source to the first grating, the orientation of the first grating, the distance from the first grating to the second grating, the material of the second grating, the orientation of the second grating, the distance from the second grating to a surface, and positional measurements of the optical pattern displayed on the surface to determine the material of the first grating. Similarly, measurements could be determined for the distance between the second grating and the surface when all other parameters are known to a computer system.

In some embodiments, an alignment of either of the gratings could be rotated such that at least some of the dots in the optical pattern rotate, and the object being measured could then be placed along a line of the dots in the optical pattern to ensure that the object is in the proper place. In other embodiments, rotating one of the gratings will cause the other grating to rotate by the same amount, causing the Then alignment could be obtained between the optical pattern and the object being measured, by adjusting abovementioned various factors.

Once alignment is obtained, measurements could computed based on parameters available from the light source 110, the gratings 120 and 130, the orientations of the gratings, and the distances 112, 122, and 132 between the light source, gratings, and surface, respectively. For example, a user could set a DDOP system to display a grid of dots where a first axis lies on a horizontal plane and a second axis lies 40 degrees from the horizontal plane, to ensure that certain devices are lined up properly. In another embodiment, a user could set up a DDOP system to display a grid of dots, and could line the grid of dots along two intersecting planes, such as two tables or two buildings (one line of dots along one axis, and another line of dots along another axis), and then look at the device to determine the angle of one plane against another plane. In that same embodiment, the user could measure the distance of the surfaces from the DDOP, which could be plugged into a computer system to determine the relative distance between one dot and another dot. Contemplated mathematical formulas involved are illustrated further below.

(II.b) Measurement with a Calibration Grating

In one embodiment, it is contemplated that a calibration grating is used in measurement of two dots in an optical spectrum. The calibration grating could be used in conjunction with any exemplary system, such as system 100 shown in FIG. 1. The spectrum of the calibration grating appears on the surface 140 on which the optical pattern also appears, and thus measurement is performed by comparing the calibration grating's spectrum and the optical pattern.

Figure 4A:
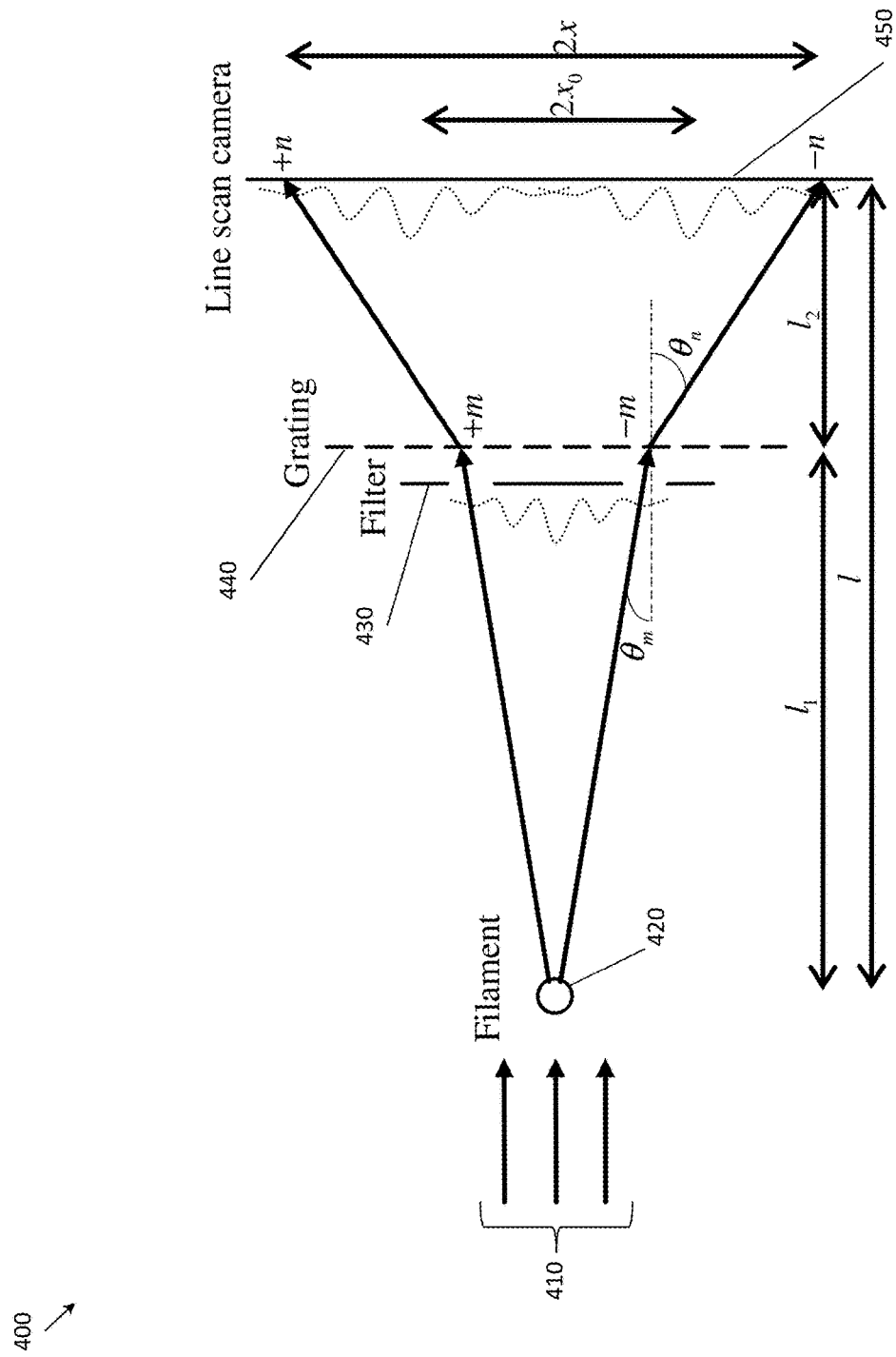
FIG. 4A is a schematic of a filament DDOP system.
Figure 4B:
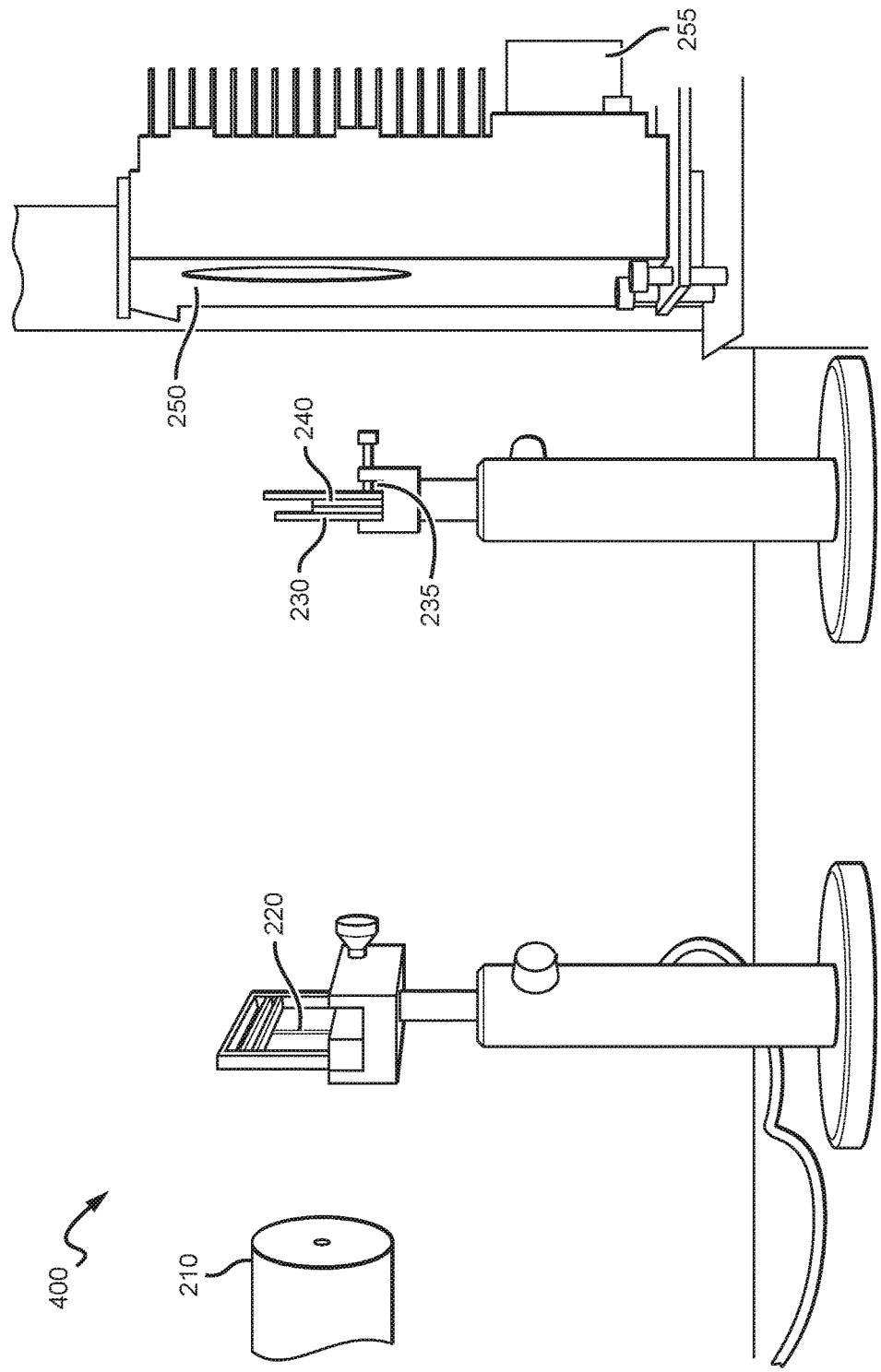
FIG. 4B shows an exemplary filament DDOP system set up in a lab.

The methods above could also be applied on other embodiments, such as in system 400 depicted in FIGS. 4A and 4B.

(II) The Setup of an Embodiment and the Theoretic Formula and Computation Methods Involved in Obtaining Measurements FIGS. 4 and 4B depict an alternative embodiment with filament grating system 400 having a light source 410, a filament 420, a filter 430, a grating 440, and a line scan camera 450. The filament is configured to exhibit diffraction phenomena based upon its material properties and dimensions. Embodiment 400 uses filament 420 as its first grating, filter 430 as its second grating, and grating 440 as its third grating. In system 400, parallel monochromatic light is diffracted first by filament 420. Filament 420 exhibits a diffraction phenomenon when light is incident on the filament which acts as a spatial light modulator. Filter 430 only allows bright stripes of ±m orders to pass through. The through-passed bright stripes are then diffracted by grating 440 into a plurality of dots onto line scan camera 450, which replaces surface 140. Line scan camera 450 detects each dot that is splayed on the surface.

(II.a) Contemplated Methods and Theoretic Formulas are Described Below.

The filament's diffraction angle of the m-order bright stripe $\theta_m$ in FIG. 4A meets the condition that $$\sin\theta_m = \frac{\lambda\alpha_m}{\pi a} \quad (1)$$

Where $\alpha_m$ is the m-th positive solution of transcendental equation $\alpha=\tan\alpha$ whose positive solution set is $\{\alpha=1.43\pi, 2.459\pi, 3.470\pi, 4.479\pi \ldots\}$.

After being diffracted by the grating behind the filter, bright stripes of ±m orders are amplified. And the departure angle of grating diffraction $\theta_n$ can be calculated by the grating equation $d(\sin\theta_m - \sin\theta_n) = -n\lambda$ $$\sin\theta_n = \sin\theta_m + \frac{n\lambda}{d} \quad (2)$$

Where d is the grating constant, n is the order of grating diffraction. Therefore the spacing between the grating diffraction's n-th stripe of the diameter diffraction's m-th bright stripe and the grating diffraction's −n-th stripe of the diameter diffraction's −m-th bright stripe is $$2x = 2l_1 \tan\theta_m + 2l_2 \tan\theta_n \quad (3)$$

Where $l_1$ is the distance between the filament and the grating, $l_2$ is the distance between the grating and the line scan camera.

Then the equation for diameter measurement based on double diffractions is obtained by applying formula (2) and (3) to formula (4)

$$x = l_1 \tan\left(\arcsin\frac{\lambda\alpha_m}{\pi a}\right) + l_2 \tan\left[\arcsin\left(\frac{\lambda\alpha_m}{\pi a} + \frac{n\lambda}{d}\right)\right] \quad (4)$$

The analytical solution of filament diameter a can't be obtained with this equation, therefore numerical methods such as bisection method and iteration method are used.

In experiments, it was observed that the choosing of m and n has the following tradeoff:

a. The effective measurement range is limited by the camera's total length; thus it's not proper to allow large spacing between stripes.

b. Further, it's not proper to choose a small m, for the reason that the grating diffraction spectrum of the +m order filament diffraction and the grating diffraction spectrum of the −m order filament diffraction would overlap so that the bright stripes' information could not be extracted correctly.

c. After these considerations, m=n=5 were chosen as practically useful in the experiment.

(II.b) Example Equipment.

The equipment is listed below was used to setup an exemplary DDOP system of FIG. 4B:

The light source is a He—Ne laser with wavelength of 632.8 nm. And the grating's constant value was 20 μm.

Various filaments were produced by Chengdu Chengliang Tools Group Co., Ltd. The respective factory nominal values of diameters were 100 μm, 120 μm and 140 μm with grade of tolerance±1 μm.

The filaments were measured using Digital Microscope VHX-5000 under 1000× magnification which is produced by Keyence Corporation. Measurements taken by the DDOP system for each filament were 100.2 μm, 120.1 μm and 140.8 μm, respectively. And the results showed that differences caused by uneven manufacturing on different locations for each filament did not exceed ±0.3 μm.

The distance from the filament to the grating and the distance from the grating to the line scan camera were respectively $l_1$=160.85 mm and $l_2$=80.01 mm which met the Fraunhofer diffraction condition $l \gg 10a^2/\lambda$.

The line scan camera was produced by Teledyne DALSA, Inc. of the model P3-80-16K40-00-R whose resolution is 16384×1, pixel size was 3.5 μm and total length was 57.344 mm.

(III) Characteristics of the Optical Patterns (III.a) the "Continuity" Characteristic of the Optical Patterns With the method in this inventive subject matter, an optical pattern changes when the distance between the two gratings changes; this "continuity" in forming optical patterns contrasts with phenomena such as the Moiré Fringes where optical patterns are visible only at certain planes such as the Talbot planes.

Figure 5C:
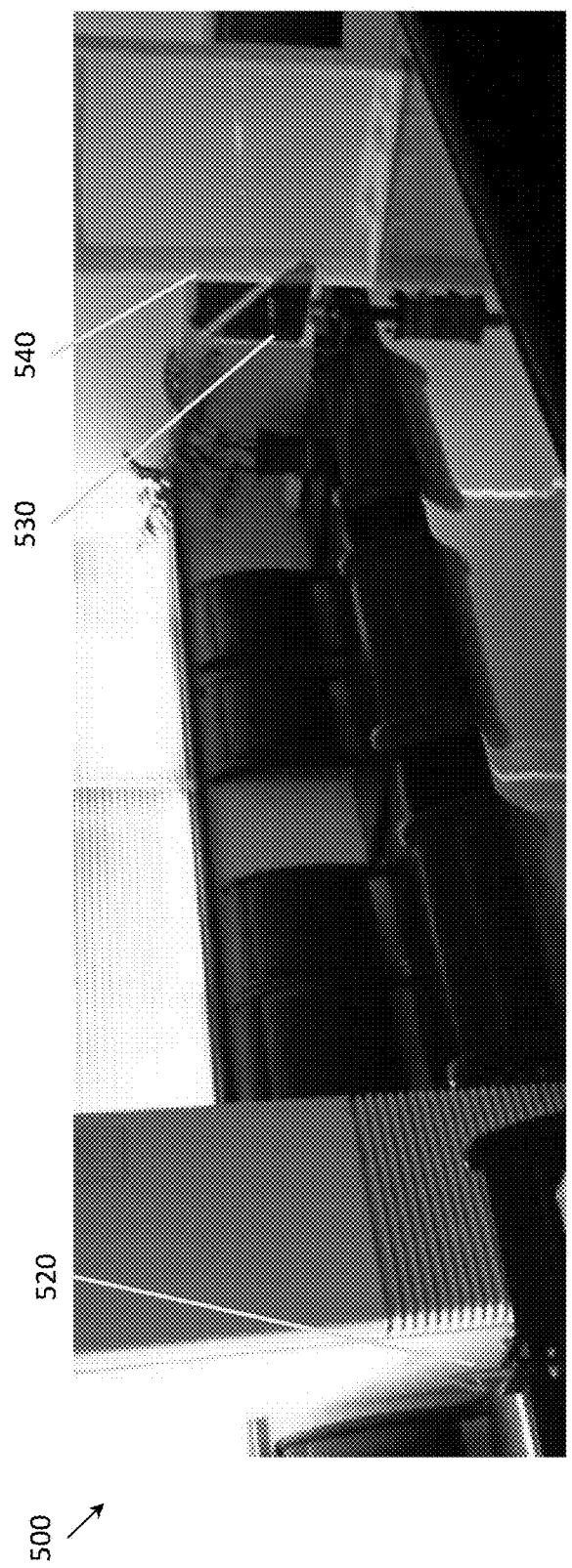
FIG. 5C shows the DDOP system of FIG. 5B having yet another differing distance between the gratings.

FIGS. 5A-5C show an embodiment 500 having a light source (not shown), a first grating 520, a second grating 530 and a surface 540, where the position of second grating 530 changes with respect to first grating 520 and surface 540, altering the characteristics of the optical pattern that is shown on surface 540. Each of the optical patterns have a "continuity" characteristic between the different surfaces when the distance between first grating 520 and second grating 530 changes. The setups in FIGS. 5A, 5B, and 5C, are each similar to the setup in FIG. 1. The salient differentiation among the three setups in FIGS. 5A, 5B, and 5C is the distance between the two gratings. The three setups show that when this distance changes, the optical patterns change to reflect the new position.

(III.b) the "Relatedness" Characteristic of the Multiple Components in an Optical Pattern.

Figure 6A:
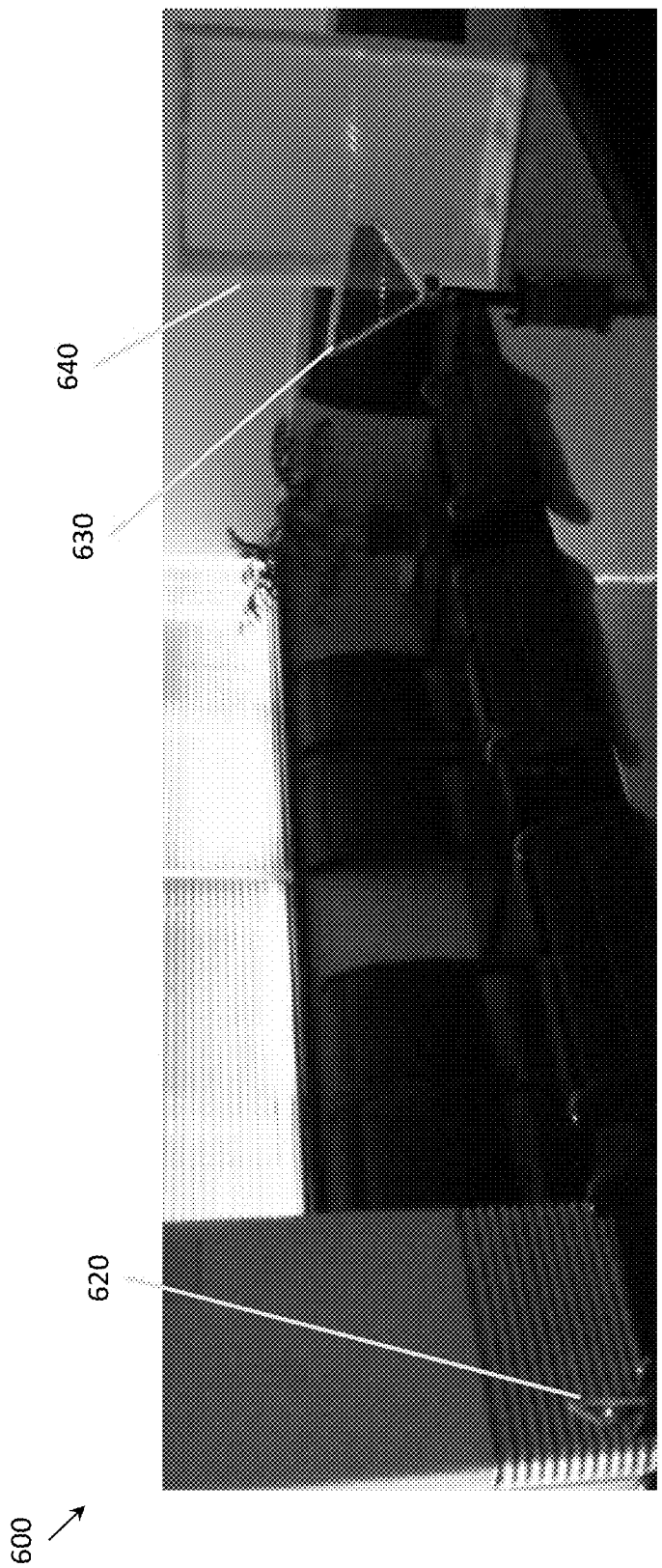
FIG. 6A shows an alternative DDOP system where the second grating is set at a first distance.
Figure 6B:
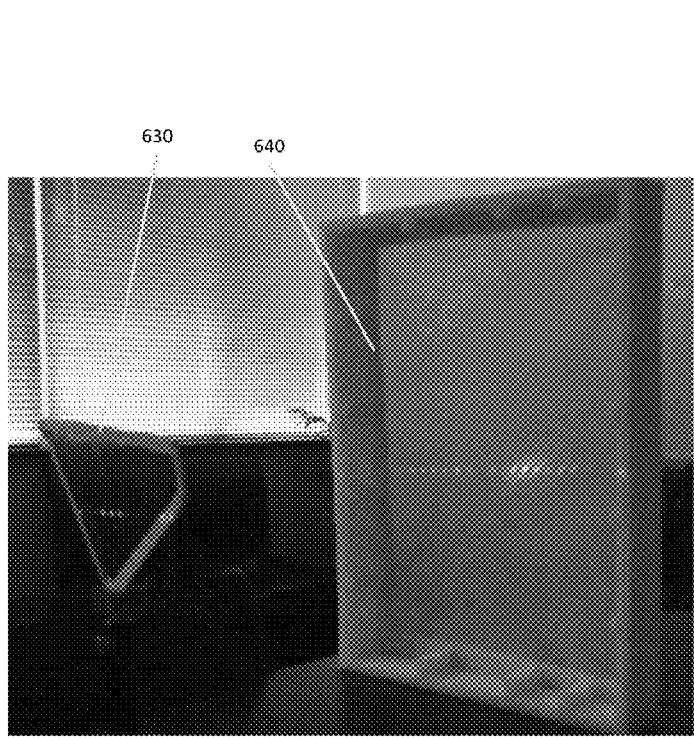
FIG. 6B shows a close-up of the second grating of the DDOP system of FIG. 6A.
Figure 6C:
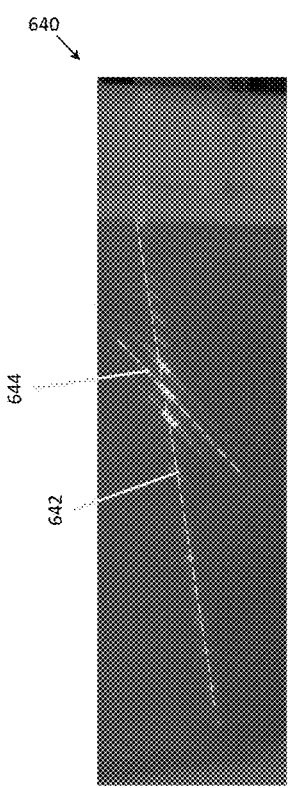
FIG. 6C shows a close-up of the surface of the DDOP system of FIG. 6B.

With the method in this inventive subject matter, an optical pattern typically has several visible components, and it is said that these components are "related", in that within an optical pattern there are rows of dots, and these rows are generally parallel to each other (when the grating is flat and made of a material of a consistent concentration) and are thus "related". FIGS. 6A, 6B, and 6C show a first system 600, and FIGS. 7A, 7B, and 7C show a similar system 700, which both have "relatedness" characteristics between both produced optical patterns.

FIG. 6A shows another DDOP system having a light source (not shown) aimed at a first grating 620, which passes some light to second grating 630, which again diffracts the light and sends some to surface 640 in the form of an optical pattern. FIG. 6B shows a zoomed-in portion of FIG. 6A, and shows more details of light shining through second grating 630 and onto surface 640 to form an optical pattern. FIG. 6C shows a close-up of surface 640 which has an optical pattern with multiple components that have "relatedness."

Figure 7A:
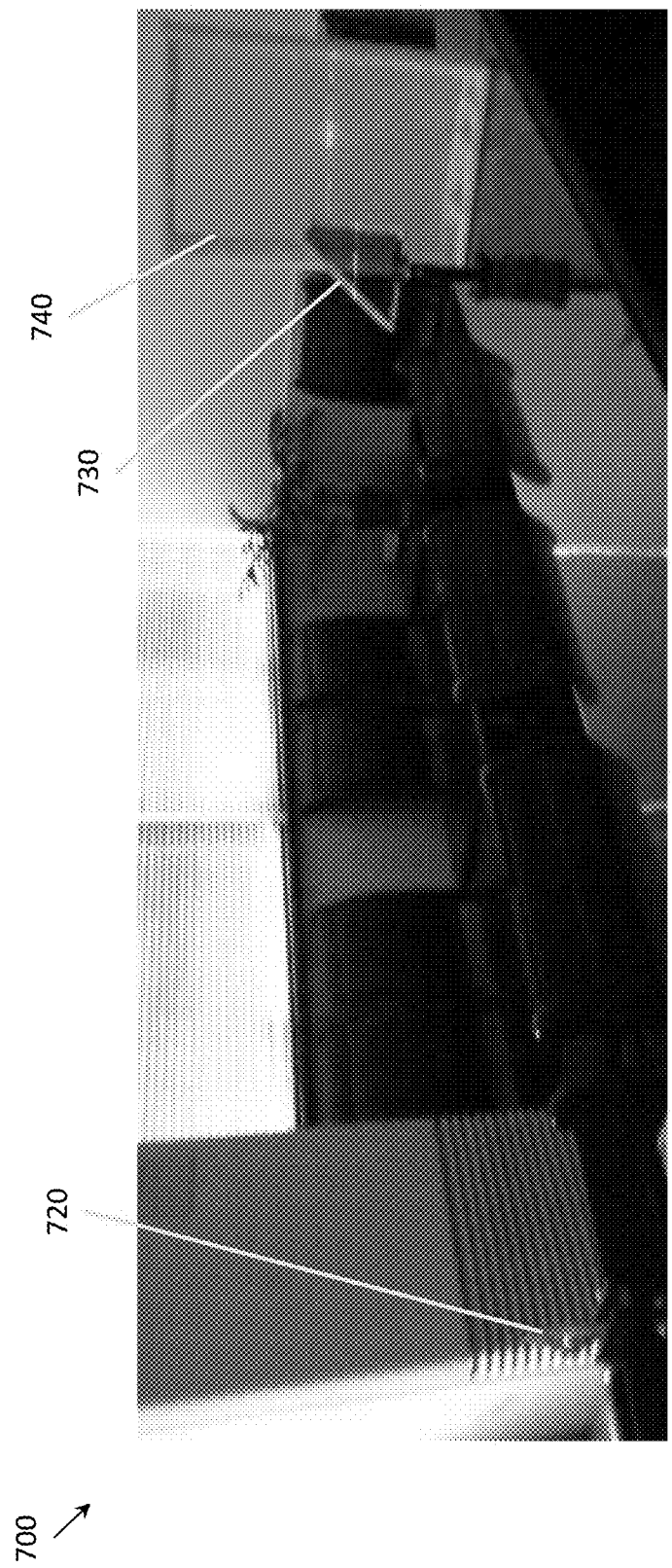
FIG. 7A shows the system of FIG. 6A, where the second grating is reset at a second distance.

The system 700 shown in FIG. 7A is similar to the system in FIG. 6A, however system 700 has second grating 730 rotated along the Y-Z plane for θ degrees. FIG. 7B shows a zoomed-in portion of FIG. 7A, and FIG. 7C shows a close-up of surface 740 having an optical pattern.

The optical pattern shown on surface 640 and on surface 740 both have "relatedness. In both the optical pattern on surface 640 and on surface 740, both optical patterns feature three long parallel columns of dots along a first axis 642 and 742, formed by first grating 620 and first grating 720, respectively. However, the optical pattern of long parallel rows along second axis 644 is angled about 30 degrees, whereas the topical pattern of long parallel rows along second axis 744 is angled about 90 degrees. Further, the change from second axis 644 to second axis 744 is formed as a function of the rotation of the second grating.

A change in the orientation of one grating relative to the other grating can create an angled incidence, allowing a user to (a) measure the angle of an object being measured by the device and/or (b) ensure that an object is angled appropriately with respect to another object. For example, a user could shine a DDOP device on an object having an angle between two components, aligning one row of dots along one component and another row of dots along the second component. Then the user could analyze a computer system that tracks the orientation of one grating relative to the other grating in order to determine the angle between the two components being measured. In the second embodiment, the user could first set the orientation of one grating relative to the other grating (e.g. a 90 degree angle or a 45 degree angle) and then aim the DDOP device at two components that need to be oriented to that angle relative to one another. The user could then align the first component along the first row along a first axis while aligning the second component along the second row along a second axis. This would particularly be useful in the embodiment shown in FIG. 3, which requires pillars 310, 320, and 330 to be equally spaced from one another, and perpendicular to surface 340.

(IV) Several Factors that have Impact on the Optical Patterns

The optical pattern in any DDOP system changes with at least the following factors, either with changes in individual factors, or changes in several factors combined:
(a) the characteristics of the light source;
(b) the characteristics of the first grating, such as its line number;
(c) the orientation of the first grating along the Y-Z plane;
(d) the characteristics of the second grating, such as its line number;
(e) the "width" of the second grating, namely how much light along its width is allowed to pass through;
(f) the orientation of the second grating along the Y-Z plane;
(g) the relative positioning of the light source and the first grating, as expressed as distance in this setup, but could be other more general positioning;
(h) the relative positioning of the two gratings, as expressed as distance in this setup, but could be other more general positioning;
(i) the relative positioning of the second grating to the plane, as expressed as the distance in this setup, but could be other more general positioning;
(j) the characteristics of the surface where the optical pattern appears, such as its geometric nature—for example, that it is a plane, or that it is a cube, or that it is of an irregular shape.

(V) Additional Embodiments (V.a) Variations in the Number of Light Sources, and Different Natures of Light Sources.

While a DDOP system preferably has at least one light source, more than one light source could be used without departing from the scope of the invention. In some embodiments, two, three, four, or even more light sources could be used.

Figure 8C:
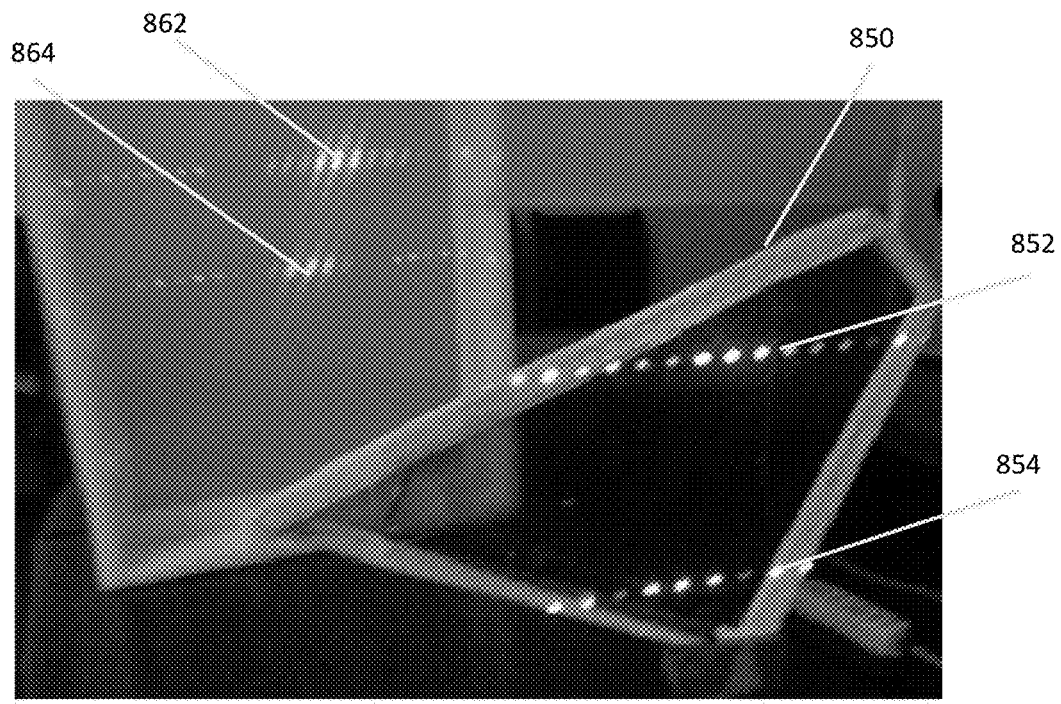
Figure 8D:
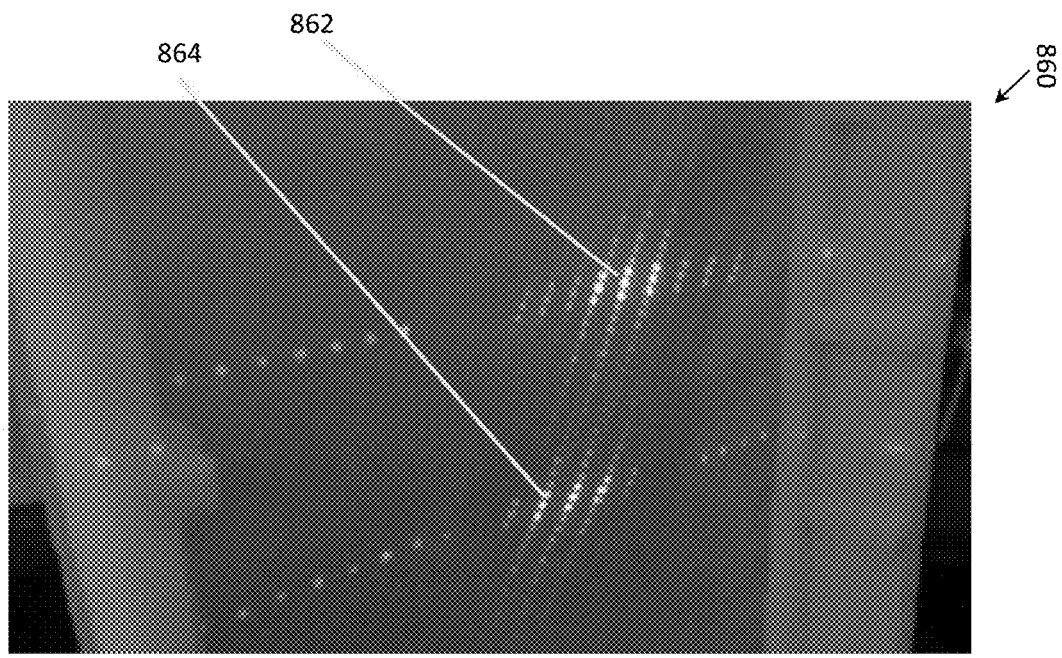

FIGS. 8A-8D show an alternative system 800 that uses two light sources 810 and 820, and three gratings 830, 840, and 850. In FIG. 8A, there is first light source 810, second light source 820, first grating 830, second grating 840, third grating 850, and surface 860. FIG. 8B shows a blown-up view of first light source 810, second light source 820, first grating 830, and second grating 840. Light from light source 810 is incident on first grating 830, and light from light from the second light source is incident on second grating 840. Both of the gratings are aimed at third grating 850—light from first grating 830 is shown as incident row of lights 852 on third grating 850 in FIG. 8C, and light from second grating 840 is shown as incident row of lights 854 on third grating 850 in FIG. 8C. As shown in FIG. 8D, an optical pattern having two grids, grid 862 and grid 864, is displayed on surface 860. In this manner, a plurality of grids could be configured to display on an object or a surface. Each optical pattern could be set to display a first row along a first axis, with each dot in the row spaced along a first distance, and display a second row along a second axis, with each dot in the row spaced along a second distance. Such configurations are especially useful to measure and track a plurality of objects using the same device.

Figure 9A:
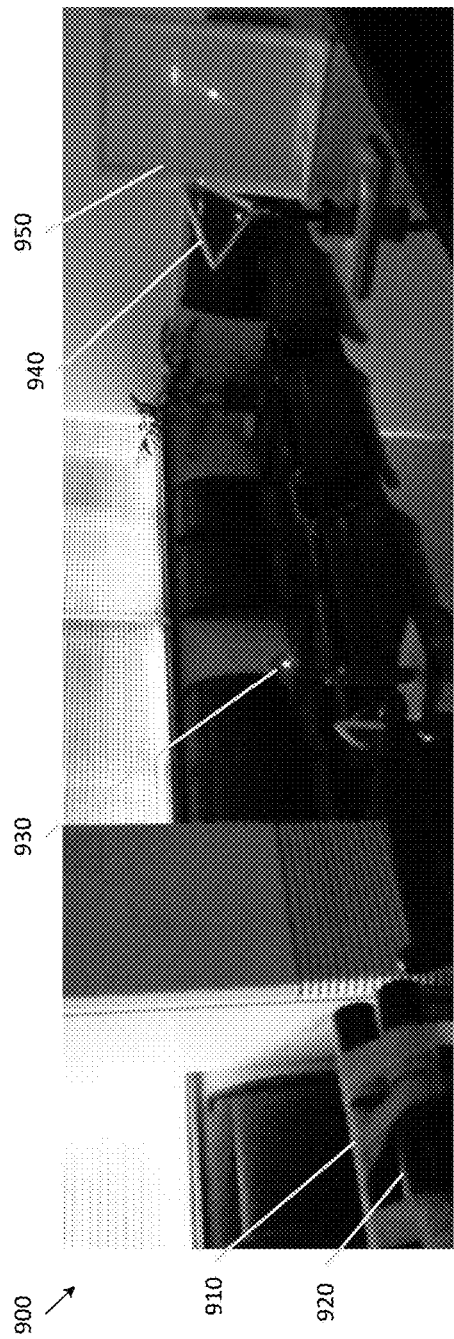
FIGS. 9A-9D show an embodiment that contains two light sources, and two gratings.
Figure 9B:
Figure 9C:
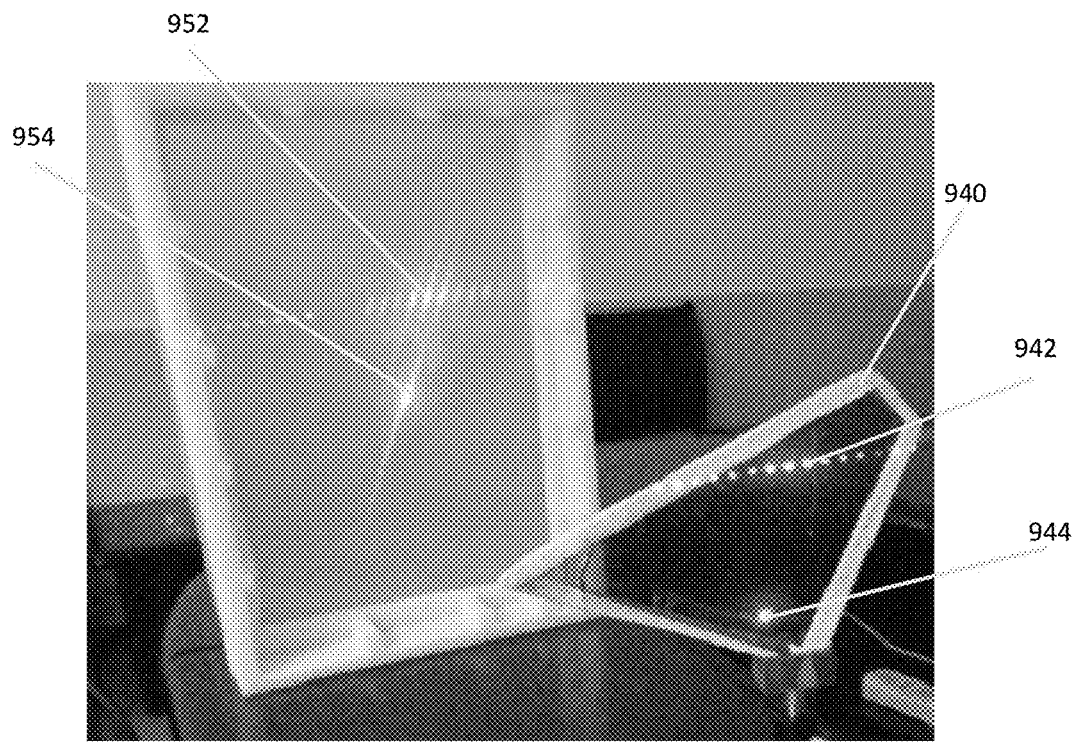
Figure 9D:

FIGS. 9A-9D show an alternative system 900 that uses two light sources 910 and 920, and two gratings 930 and 940. In FIG. 9A, there is first light source 910, second light source 920, first grating 930, second grating 940, and surface 950. FIG. 9B shows a blown-up view of first light source 910, second light source 920, and first grating 930. Light from the first light source 910 is incident on first grating 930, but light from the second light source 920 is not incident on first grating 930. Light passing through first grating 930 is incident on second grating 940 as incident light 942, and light from second light source 920 is also incident on second grating 940 as incident light 944. Incident light 942 has been diffracted into a row of dots by first grating 930, whereas incident light 944 has yet to be diffracted. FIG. 9C shows a close-up of second grating 940 and surface 950, and FIG. 9D shows how two optical patterns are formed, a first is a grid optical pattern 952, and the second is a row of dots 954.

Figure 10A:
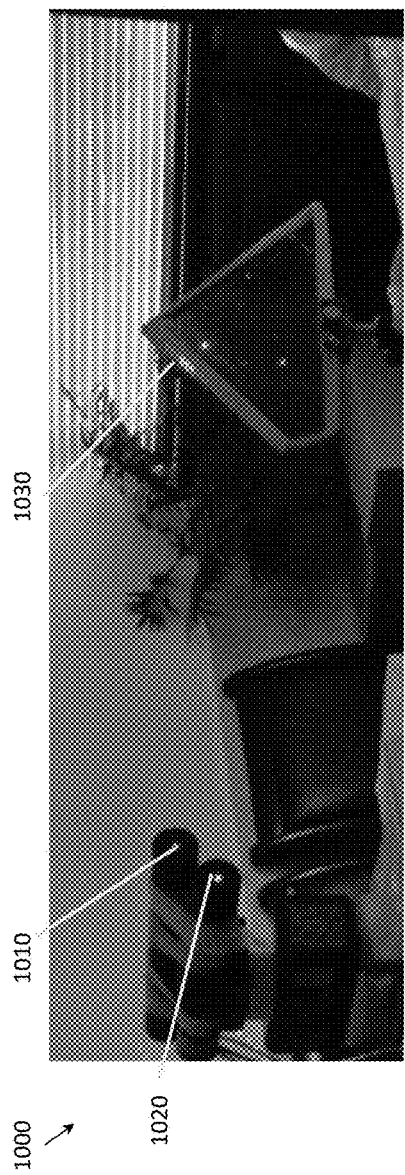
FIGS. 10A-10D show an embodiment that contains two light sources as well as a reflective grating.
Figure 10B:
Figure 10C:
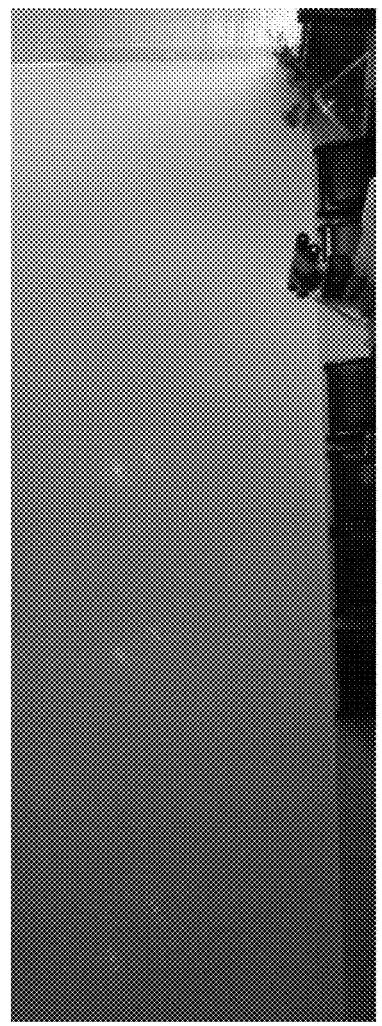
Figure 10D:
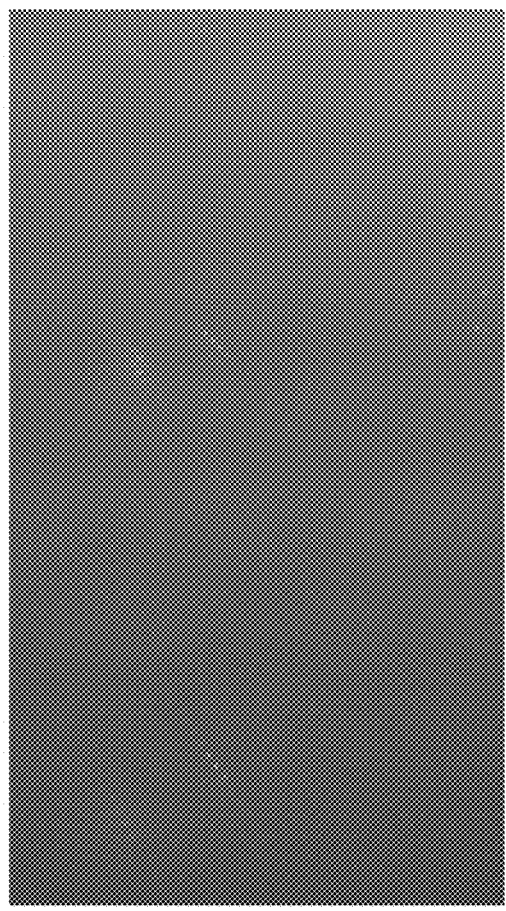

FIGS. 10A-10D show an alternative system 1000 that contains two light sources 1010 and 1020 as well as a reflective grating 1030. FIG. 10A shows a first light source 1010 and a second light source 1020 both aimed at reflective grating 1030. Reflective grating is shown as a reflective grid grating, but could be any grating without departing from the scope of the current invention. FIG. 10B shows a close-up of reflective grating 1030, which reflects light from light source 1010 and light source 1020 onto a surface behind light sources 1010 and 1020, such as surface 1040, which shows how the incident light from light source 1010 shining on reflective grating 1030 as incident light 1032, and how incident light from light source 1020 shining on reflective grating 1030 as incident light 1034, is splayed into a plurality of optical patterns in a grid form on surface 1040. FIG. 10C shows a view of the optical pattern displayed on a large wall 1050, while FIG. 10D shows a close-up of the grid optical pattern displayed on large wall 1050.

(V.b) Variations Line Numbers of the Gratings

Figure 11A:
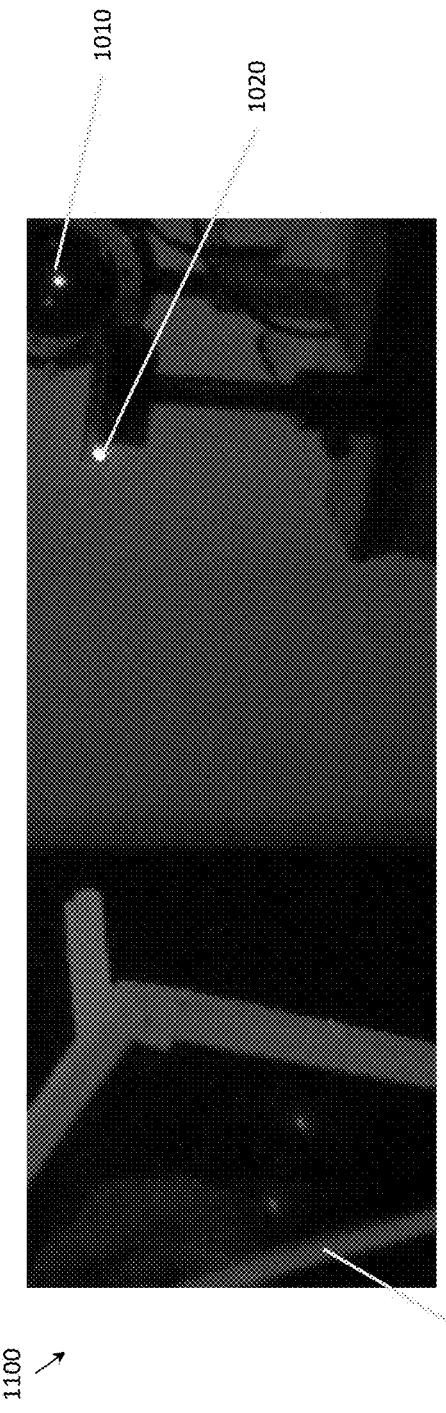
FIGS. 11A-11B show an embodiment having a first optical pattern impacted by a first line number of the gratings.
Figure 11B:
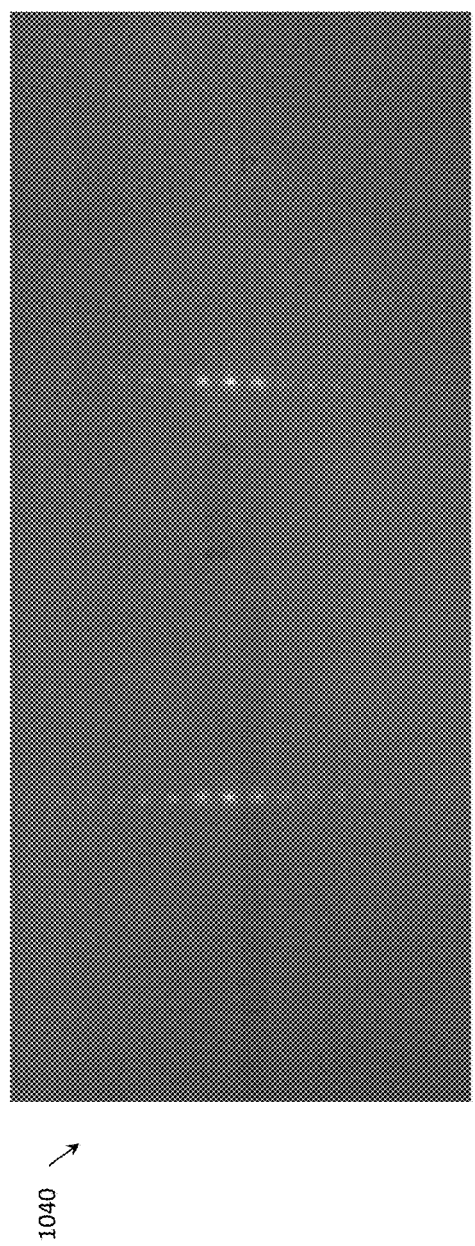

FIGS. 11A-11B show a system 1100 having a first light source 1110, a first grating 1120 with a first line number, a second grating 1130 with a second line number, and a surface 1140. FIGS. 12A-12B show a system 1200 having the same first light source 1210, the same first grating 1220 with a first line number, a third grating 1230 with a third line number different from the second line number, and a surface 1240. As shown, the optical pattern on surface 1140 is markedly different than the optical pattern on surface 1240 due to the difference in line numbers. Third grating 1230 has a smaller line number than second grating 1130, and the dots are spaced out further. Such properties are particularly useful for embodiments which could use a plurality of grating systems for measuring a device. Preferably, the system is set up such that a computer system automatically switches from one grating to another based upon a user inputting in a preferred line number.

(V.c) Variations in the Nature of the Gratings.

Figure 13:
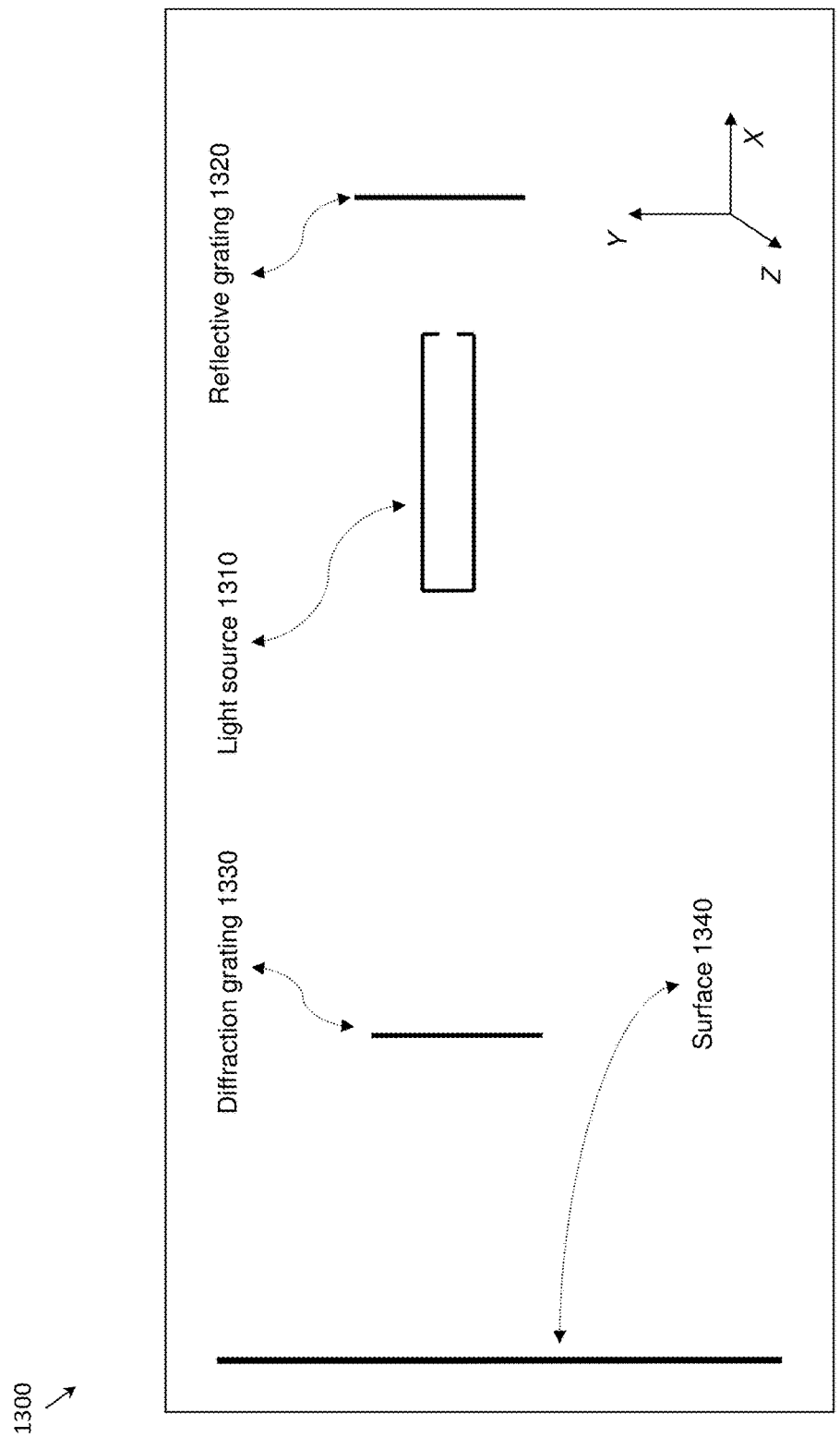
FIG. 13 shows a schematic diagram of a system that contains one reflective grating.

FIG. 13 is a schematic of a reflective grating system having light source 1310 that is aimed at reflective grating 1320, which both reflects and diffracts the light towards diffraction grating 1330, which then directs refracted light towards surface 1340 to form an optical pattern.

Figure 14A:
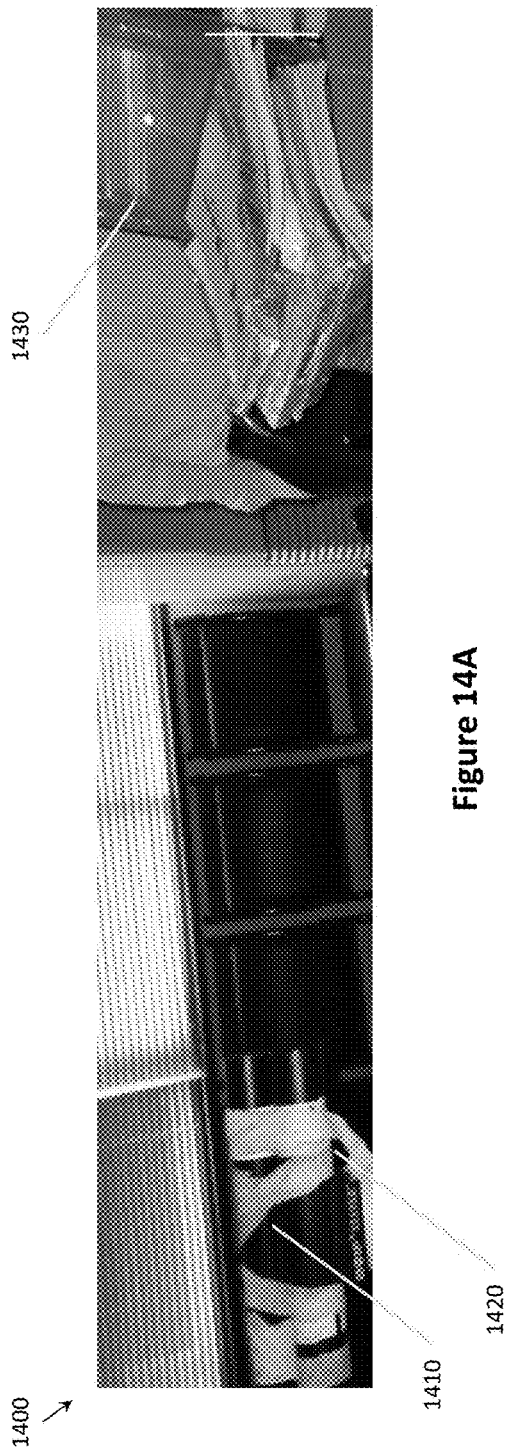
FIGS. 14A-14C show an embodiment that contains a reflective grating.
Figure 14B:
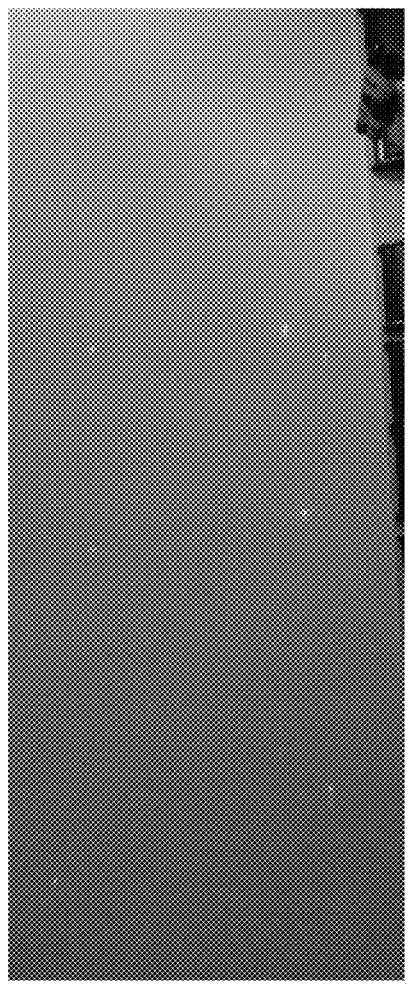
Figure 14C:

FIGS. 14A-14C show an alternative system 1400 having a first light source 1410 and a second light source 1420 both aimed at reflective grid grating 1430. The light from light source 1410 and light source 1420 hits reflective grid grating 1430, and shines onto a surface behind light source 1410. An exemplary surface 1430 is shown in FIG. 14B, which shows the grid pattern caused by the light source 1410 and light source 1420 hitting reflective grid grating 1430. In order to create a complex optical pattern used to measure a plurality of aspects, the a user could insert a second grating (not shown) in between light sources 1410 and 1420 and reflective grid grating 1430. The optical pattern that would be produced is shown in FIG. 14C on surface 1440.

(V.d-b) Variations in the Orientation of the Axes of the Two Gratings.

Figure 15:
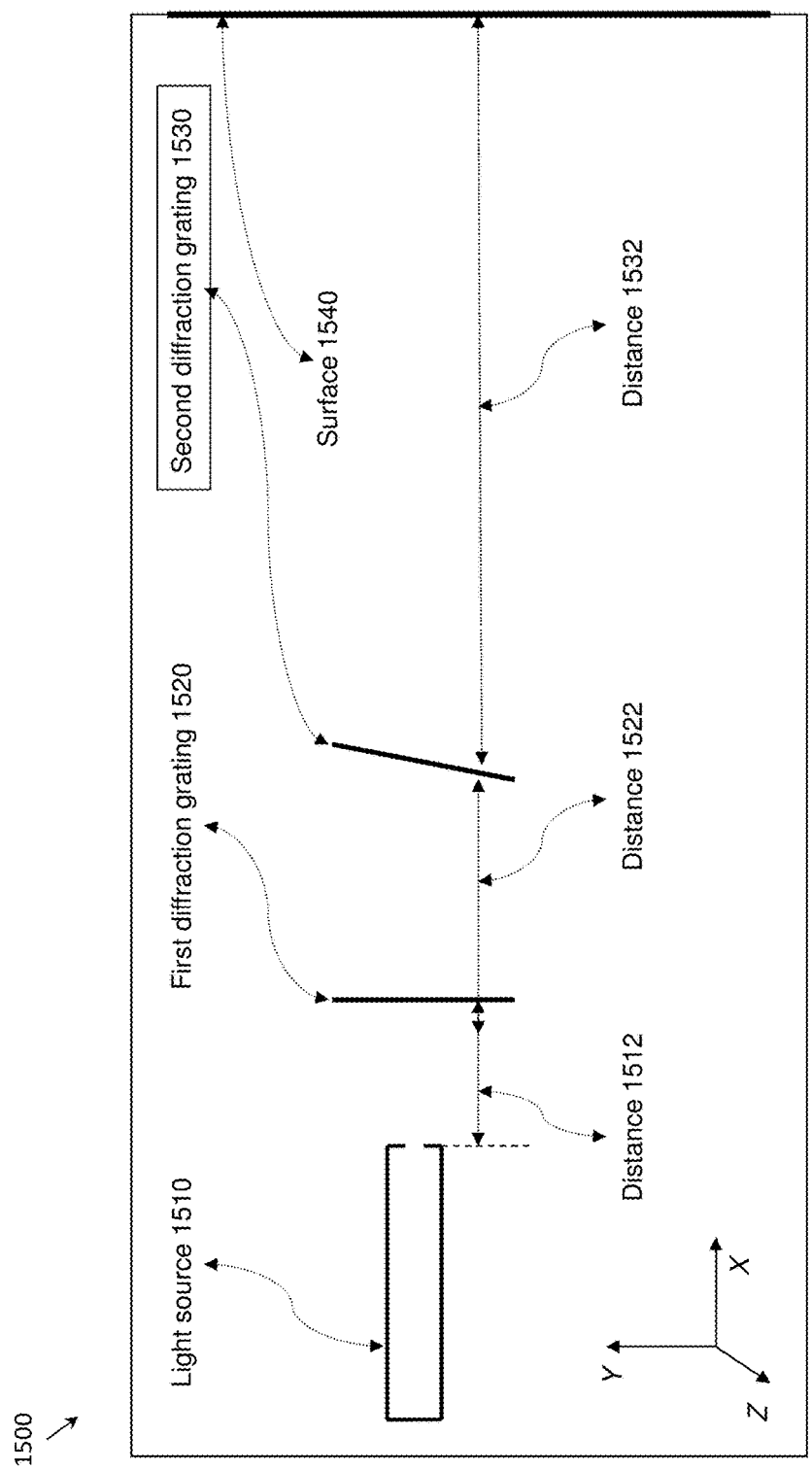
FIG. 15 shows a "surface" that is formed by the ceiling of a room and one wall, with an optical pattern shown on the surface.

FIG. 15 is a schematic 1500 of another alternative embodiment, having light source 1510, perpendicular first diffraction grating 1520, angled second diffraction grating 1530, and surface 1540. As shown, angled second diffraction grating 1530 could be angled from first diffraction grating 1520 away from the Y-Z plane, which could be useful in systems where the angle of the optical spectrum needs to be adjusted slightly (V.e) Variations in the "Width" of the Second Grating.

FIGS. 11A-11B show an embodiment 1100, and FIGS. 12A-12B show a similar embodiment 1200; the two embodiments combined illustrate that by varying the "width" of the second grating (namely how many bright spots are allowed to pass through), the optical patterns change accordingly. In the first setup, FIG. 11A, shows that the second grating allows two bright spots (the central aperture plus one spectrum) to pass through, and an optical pattern, which is two vertical columns of bright spots, can be observed as shown in FIG. 11B. In the second setup, FIG. 12A shows the second grating allows one bright spots (the central aperture) to pass through, and an optical pattern which is one vertical column of bright spots, can be observed as shown in FIG. 12B. These two setups, with only salient difference being the "width" of the second grating, show that the angular relationships and distance relationships between these bright spots are partially dependent on the width of the second grating.

(V.f) Variations in the Distance Between the Two Gratings.

FIGS. 5A-5C illustrate that by varying the distance between the two gratings, the optical pattern changes accordingly. The setups in FIGS. 5A, 5B, and 5C are the same to each other, with the salient difference being the distance between the two gratings. With a longer distance between the two gratings, the optical pattern has more dense dots—namely more dots per unit length on the surface.

(V.g) Variations in the Surface.

While the surface where the optical pattern appears (e.g. surface 130 in FIG. 1) in many embodiments is a plane, it is contemplated that other surfaces are useful, including but are not limited to:

(1) surfaces that can be described by simple geometric functions, such as a concave or a convex.
(2) surfaces that cannot be described by simple geometric functions.
(3) considering the interior of a room, the surface that is formed by the ceiling and one wall.
(4) considering the interior of a room, the surface that is formed by the ceiling and two neighboring walls.
(5) a line scan camera.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An optical guide, comprising:
a first light source;
a first diffraction grating configured to split a first light beam from the first light source to produce a first plurality of parallel light beams along a first axis, wherein the first diffraction grating has a first side and a second side opposite to the first side, and wherein the first light beam enters the first side and the first plurality of parallel light beams exit the second side;

a second diffraction grating configured to split at least one of the first plurality of light beams to produce a second plurality of light beams along a second axis, wherein the second axis changes as the second diffraction grating rotates and is angled from the first axis; and an adjustment mechanism that adjusts an angle of the second axis relative to the first axis along the rotation axis.

2. The optical guide of claim 1, wherein the first light source comprises a laser.

3. The optical guide of claim 1, wherein the first diffraction grating is configured to provide a first even spacing between at least three of the first plurality of light beams when the first plurality of light beams hit an object.

4. The optical guide of claim 3, wherein the second diffraction grating is configured to provide a second even spacing between at least three of the second plurality of light beams when the second plurality of light beams hit the object, wherein the first even spacing is substantially equal to the second even spacing.

5. The optical guide of claim 1, further comprising a computer processor configured to:

calculate a spacing between the second plurality of light beams when the second plurality of light beams hit an object; and present a representation of the calculated spacing.

6. The optical guide of claim 5, wherein the computer processor are further configured to:

calculate the angle of the second axis relative to the first axis; and present a representation of the angle.

7. The optical guide of claim 1, wherein the second diffraction grating comprises a reflective portion.

8. The optical guide of claim 1, wherein the adjustment mechanism rotates the second diffraction grating to alter the angle of the second axis relative to the first axis.

9. The optical guide of claim 1, wherein the second diffraction grating has a major surface parallel to a major surface the first diffraction grating;

wherein the first axis changes as the first diffraction grating rotates along a rotation axis perpendicular to both the first axis and the major surface of the first diffraction grating and the major surface of the second diffraction grating; and wherein the second axis changes as the first diffraction grating rotates along the rotation axis.

10. The optical guide of claim 1, wherein the second plurality of light beams comprise light pattern points.

* * * * *